US010116937B2

(12) United States Patent
Li et al.

(10) Patent No.: US 10,116,937 B2
(45) Date of Patent: Oct. 30, 2018

(54) ADJUSTING QUANTIZATION/SCALING AND INVERSE QUANTIZATION/SCALING WHEN SWITCHING COLOR SPACES

(71) Applicant: Microsoft Technology Licensing, LLC, Redmond, WA (US)

(72) Inventors: Bin Li, Beijing (CN); Jizheng Xu, Beijing (CN); Gary J. Sullivan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 15/029,223

(22) PCT Filed: Mar. 27, 2014

(86) PCT No.: PCT/CN2014/074197
§ 371 (c)(1),
(2) Date: Apr. 13, 2016

(87) PCT Pub. No.: WO2015/143671
PCT Pub. Date: Oct. 1, 2015

(65) Prior Publication Data
US 2016/0261865 A1    Sep. 8, 2016

(51) Int. Cl.
*H04N 7/12*   (2006.01)
*H04N 19/124*   (2014.01)
(Continued)

(52) U.S. Cl.
CPC ............ *H04N 19/124* (2014.11); *H04N 9/64* (2013.01); *H04N 19/136* (2014.11);
(Continued)

(58) Field of Classification Search
CPC ........ H04N 19/15; H04N 19/46; H04N 19/86; H04N 19/117; H04N 11/042; H04N 1/603
(Continued)

(56) References Cited

U.S. PATENT DOCUMENTS 5,805,228 A   9/1998   Proctor et al.
6,266,440 B1  7/2001   Oneda
(Continued)

FOREIGN PATENT DOCUMENTS

CN   1921627   2/2007
CN   101076125  11/2007
(Continued)

OTHER PUBLICATIONS

Communication pursuant to Article 94(3) EPC dated Mar. 6, 2017, from European Patent Application No. 14886682.5, 7 pp.
(Continued)

*Primary Examiner* — Gims S Philippe
(74) *Attorney, Agent, or Firm* — Klarquist Sparkman, LLP

(57) ABSTRACT

Innovations in adaptive encoding and decoding for units of a video sequence can improve coding efficiency when switching between color spaces during encoding and decoding. For example, some of the innovations relate to adjustment of quantization or scaling when an encoder switches color spaces between units within a video sequence during encoding. Other innovations relate to adjustment of inverse quantization or scaling when a decoder switches color spaces between units within a video sequence during decoding.

20 Claims, 10 Drawing Sheets

(51) Int. Cl.
*H04N 9/64* (2006.01)
*H04N 19/136* (2014.01)
*H04N 19/186* (2014.01)
*H04N 19/174* (2014.01)
*H04N 19/176* (2014.01)

(52) U.S. Cl.
CPC ......... *H04N 19/174* (2014.11); *H04N 19/176* (2014.11); *H04N 19/186* (2014.11)

(58) Field of Classification Search
USPC .......................... 375/240.01–240.29, 240.03
See application file for complete search history.

(56) References Cited

U.S. PATENT DOCUMENTS

| | | | |
|---|---|---|---|
| 6,330,076 | B1 | 12/2001 | Imaizumi et al. |
| 6,961,736 | B1 | 11/2005 | Amirghodsi |
| 8,189,243 | B1 | 5/2012 | Borg |
| 8,411,753 | B2 | 4/2013 | Cha et al. |
| 8,446,960 | B2 | 5/2013 | Marpe et al. |
| 8,488,670 | B2 | 7/2013 | Demos et al. |
| 8,860,785 | B2 | 10/2014 | Ji et al. |
| 9,225,991 | B2 * | 12/2015 | Tourapis ................ H04N 19/46 |
| 9,294,766 | B2 * | 3/2016 | Tourapis ................ H04N 19/15 |
| 9,451,258 | B2 * | 9/2016 | Van Der Auwera ........................ H04N 19/117 |
| 9,756,353 | B2 | 9/2017 | Ye et al. |
| 2002/0140693 | A1 | 10/2002 | Nakami et al. |
| 2005/0152612 | A1 * | 7/2005 | Spaulding .............. H04N 1/603 382/254 |
| 2005/0232501 | A1 | 10/2005 | Mukerjee |
| 2005/0259730 | A1 * | 11/2005 | Sun ...................... H04N 11/042 375/240.03 |
| 2005/0271288 | A1 | 12/2005 | Suzuki et al. |
| 2005/0276474 | A1 | 12/2005 | Um et al. |
| 2007/0014479 | A1 | 1/2007 | Kim et al. |
| 2008/0144929 | A1 | 6/2008 | Kwak et al. |
| 2009/0087111 | A1 | 4/2009 | Noda et al. |
| 2009/0147856 | A1 | 6/2009 | Song et al. |
| 2009/0168894 | A1 | 7/2009 | Marpe et al. |
| 2009/0180555 | A1 | 7/2009 | Sun et al. |
| 2009/0284554 | A1 | 11/2009 | Doser |
| 2009/0296808 | A1 | 12/2009 | Regunathan et al. |
| 2010/0027973 | A1 | 2/2010 | Cheng et al. |
| 2010/0157154 | A1 | 6/2010 | Kobayashi et al. |
| 2010/0202512 | A1 * | 8/2010 | Choi ...................... H04N 19/186 375/240.03 |
| 2010/0208989 | A1 | 8/2010 | Narroschke et al. |
| 2010/0272185 | A1 | 10/2010 | Gao et al. |
| 2011/0090961 | A1 | 4/2011 | Fong et al. |
| 2012/0275697 | A1 | 11/2012 | McDowell et al. |
| 2013/0010864 | A1 | 1/2013 | Teng |
| 2013/0051452 | A1 | 2/2013 | Li et al. |
| 2013/0083855 | A1 | 4/2013 | Kottke |
| 2013/0101018 | A1 | 4/2013 | Chong et al. |
| 2013/0121415 | A1 | 5/2013 | Wahadaniah et al. |
| 2013/0188693 | A1 | 7/2013 | Xu et al. |
| 2013/0188696 | A1 | 7/2013 | Liu |
| 2013/0215971 | A1 | 8/2013 | Regunathan et al. |
| 2013/0272385 | A1 | 10/2013 | Yu et al. |
| 2014/0003497 | A1 | 1/2014 | Sullivan et al. |
| 2014/0003527 | A1 | 1/2014 | Tourapis |
| 2014/0029846 | A1 | 1/2014 | Su et al. |
| 2014/0219347 | A1 | 8/2014 | Xu et al. |
| 2014/0301478 | A1 | 10/2014 | Deshpande et al. |
| 2014/0376611 | A1 | 12/2014 | Kim et al. |
| 2015/0264405 | A1 | 9/2015 | Zhang et al. |
| 2015/0358631 | A1 | 12/2015 | Zhang et al. |
| 2015/0373327 | A1 | 12/2015 | Zhang et al. |
| 2016/0261884 | A1 | 9/2016 | Li et al. |
| 2016/0261885 | A1 | 9/2016 | Li et al. |

FOREIGN PATENT DOCUMENTS

| | | |
|---|---|---|
| CN | 101110963 | 1/2008 |
| CN | 101163252 | 4/2008 |
| CN | 101640807 | 2/2010 |
| CN | 101796843 | 8/2010 |
| CN | 101945282 | 1/2011 |
| CN | 102572475 | 7/2012 |
| CN | 102761738 | 10/2012 |
| CN | 103096092 | 5/2013 |
| CN | 103119937 | 5/2013 |
| CN | 103297769 | 9/2013 |
| CN | 103650512 | 3/2014 |
| EP | 2887672 | 6/2015 |
| JP | 11-164152 | 6/1999 |
| JP | 2009-523337 | 6/2009 |
| JP | 2011-188368 | 9/2011 |
| JP | 2013-187723 | 9/2013 |
| JP | 2013-239923 | 11/2013 |
| KR | 20080067226 | 7/2008 |
| RU | 2433478 | 11/2011 |
| RU | 2470480 | 12/2012 |
| WO | WO 03/007496 | 1/2003 |
| WO | WO 2005/034092 | 4/2005 |
| WO | WO 2012/122426 | 9/2012 |
| WO | WO 2014/045506 | 3/2014 |
| WO | WO 2015/091360 | 6/2015 |

OTHER PUBLICATIONS

Dai et al., "RCE1: Adaptive Color Transforms for Range Extensions," JCTVC-M0048, 10 pp. (Apr. 2013).

Flynn et al., "High Efficiency Video Coding (HEVC) Range Extensions Text Specification: Draft 7," JCTVC-Q1005_v9, 350 pp. (Jun. 2014).

Goffman-Vinopal et al., "Color Image Compression Using Intercolor Correlation," *IEEE Int'l Conf. on Image Processing*, vol. 2, pp. 353-356 (Sep. 2002).

Joshi et al., "High Efficiency Video Coding (HEVC) Screen Content Coding: Draft 1," JCTVC-R1005-v2, 360 pp. (Jun. 2014).

Kawamura, "AHG7: In-loop Color-space Transformation of Residual Signals for Range Extensions," JCTVC-L0371, 4 pp. (Jan. 2013).

Kim et al., "Color Format Extension," JVT-H018, 17 pp. (May 2003).

Li et al., "On Residual Adaptive Colour Transform," JCTVC-S0086, 15 pp. (Oct. 8, 2014).

Norkin et al., "HEVC Deblocking Filter," *IEEE Trans. On Circuits and Systems for Video Technology*, vol. 22, No. 12, pp. 1746-1754 (Dec. 2012).

Notice on the Second Office Action and Search Report dated Jun. 6, 2017, from Chinese Patent Application No. 201480029700.1, 13 pp.

Office Action and Search Report dated Jul. 11, 2017, from Russian Patent Application No. 2016138145, 8 pp.

Search Report dated Feb. 23, 2017, from European Patent Application No. 14886682.5, 6 pp.

Visharam et al., "Extending the AVC File Format (14496-15) to support FRExt," ISO/IEC JTC1/SC29/WG11, MPEG 2004/M11425, 4 pp. (Oct. 2004).

Yu et al., "Common Conditions for Screen Content Coding Tests," JCTVC-R1015, 5 pp. (Aug. 2014).

Zhang et al., "SCCES Test 3.2.1: In-loop Color-space Transform," JCTVC-R0147, version 2, 8 pp. (Jul. 2014).

International Preliminary Report on Patentability dated Oct. 6, 2016, from International Patent Application No. PCT/CN2014/074197, 10 pp.

Bankoski et al., "VP8 Data Format and Decoding Guide," RFC 6386, 304 pp. (Nov. 2011).

Chen et al., "Description of screen content coding technology proposal by Qualcomm," JCTVC-Q0031, 18 pp. (Mar. 2014).

Flynn et al., "High Efficiency Video Coding (HEVC) Range Extensions text specification: Draft 6," JCTVC-P1005_v1, 355 pp. (Jan. 2014).

International Search Report and Written Opinion dated May 28, 2014, from International Patent Application No. PCT/CN2014/074197, 17 pp.

(56) References Cited

OTHER PUBLICATIONS

ISO/IEC 11172-2, "Information technology—Coding of moving pictures and associated audio for digital storage media at up to about 1,5 Mbit/s—Part 2: Video," 122 pp. (Aug. 1993).
ISO/IEC 14496-2, "Information Technology—Coding of Audio-Visual Objects: Visual," ISO/IEC JTC1/SC29/WG11 N2202, 327 pp. (Mar. 1998).
ITU-T Recommendation H.261, "Video Codec for Audiovisual Services at p x 64 kbits," 29 pp. (Mar. 1993).
ITU-T Recommendation H.262, "Generic Coding of Moving Pictures and Associated Audio Information: Video," 218 pp. (Jul. 1995).
ITU-T Recommendation H.263, "Video coding for low bit rate communication," 167 pp. (Feb. 1998).
ITU-T Recommendation H.264, "Advanced video coding for generic audiovisual services," 680 pp. (Jan. 2012).
ITU-T Recommendation H.265, "High efficiency video coding," 317 pp. (Apr. 2013).
Joshi et al., "High Efficiency Video Coding (HEVC) Screen Content Coding Draft 1," JCTVC-R1005, 358 pp. (Jun. 2014).
Kim et al., "A New Color Transform for Rgb Coding," *Int'l Conf. on Image Processing*, pp. 107-110 (Oct. 2004).
Li et al., "Description of screen content coding technology proposal by Microsoft," JCTVC-Q0035, 27 pp. (Mar. 2014).
Li et al., "Fix for adaptive color space coding in JCTVC-Q0035," JCTVC-Q0213, 3 pp. (Mar. 2014).
Marpe et al., "An Adaptive Color Transform Approach and its Application in 4:4:4 Video Coding," *European Signal Processing Conf.*, 5 pp. (Sep. 2006).
Marpe et al., "Macroblock-Adaptive Residual Color Space Transforms for 4:4:4 Video Coding," *IEEE Int'l Conf on Image Processing*, pp. 3157-3160 (Oct. 2006).
Pendu et al., "Adaptive Re-Quantization for High Dynamic Range Video Compression," *IEEE Int'l Conf on Acoustic, Speech and Signal Processing*, 5 pp. (May 2014).
Schonberg et al., "Techniques for Enhancing JPEG XR / HD Photo Rate-Distortion Performance for Particular Fidelity Metrics," *Proc. SPIE*, vol. 7073, 12 pp. (Sep. 2008).
SMPTE Standard, "VC-1 Compressed Video Bitstream Format and Decoding Process," SMPTE 421M-2006, 493 pp. (Feb. 2006).
Strutz, "Adaptive Selection of Colour Transformations for Reversible Image Compression," *European Signal Processing Conf.*, pp. 1204-1208 (Aug. 2012).
Sullivan et al., "Overview of the High Efficiency Video Coding (HEVC) Standard," *IEEE Trans. On Circuits and Systems for Video Technology*, vol. 22, No. 12, pp. 1649-1668 (Dec. 2012).
Wang et al., "High Efficiency Video Coding (HEVC) Defect Report 3," JCTVC-P1003_v1 (relative to JCTVC-O1003_v2), 313 pp. (Jan. 2014).
Winken et al., "Bit-Depth Scalable Video Coding," *IEEE Int'l Conf. on Image Processing*, vol. 1, 4 pp. (Sep. 2007).
Xiu et al., "Description of screen content coding technology proposal by InterDigital," JCTVC-Q0037, 30 pp. (Mar. 2014).
Xiu et al., "HEVC Screen Content Coding Core Experiment 5 (SCCE5): Inter-component prediction and adaptive color transforms," JCTVC-Q1125, 4 pp. (Mar. 2014).
Zhang et al., "AhG8: In-loop color-space transform," JCTVC-Q0112, 7 pp. (Mar. 2014).
Zhang et al., "SCCE5 Test 3.2.1: In-loop color-space transform," JCTVC-R0147, 8 pp. (Jun. 2014).
Anonymous, "JCT-VC HEVC," downloaded from the World Wide Web, 10 pp. (downloaded on Apr. 13, 2016).
Notice on the First Office Action and Search Report dated Sep. 18, 2016, from Chinese Patent Application No. 201480029700.1, 13 pp.
Communication pursuant to Article 94(3) EPC dated Jan. 16, 2018, from European Patent Application No. 14886682.5, 4 pp.
Decision on Grant dated Jan. 9, 2018, from Russian Patent Application No. 2016138145, 18 pp.
Invitation pursuant to Article 94(3) and Rule 71(1) EPC dated Sep. 11, 2017, from European Patent Application No. 14886682.5, 5 pp.
Malvar et al., "YCoCg-R: A Color Space with RGB Reversibility and Low Dynamic Range" JVT-I0143r3, 8 pp. (Jul. 2003).
Notice on Grant of Patent dated Sep. 6, 2017, from Chinese Patent Application No. 201480029700.1, 4 pp.
Office Action dated Feb. 6, 2018, from Japanese Patent Application No. 2016-559227, 5 pp.
Official Action dated Oct. 3, 2017, from Russian Patent Application No. 2016138145, 3 pp.
Okubo et al., "H.264/AVC Textbook," Impress Standard Textbook Series, pp. 145-147 (Jan. 2009).
Suzuki et al., "Picture Quality Control and Subjective Evaluation in RGB Color Coding," Abstract Only of IEICE Tech. Rep., vol. 111, No. 318, IMQ2011-16, pp. 7-10, Nov. 2011.
Examination Report dated Jun. 20, 2018, from Australian Patent Application No. 2014388185, 3 pp.
Notice of Acceptance dated Jul. 24, 2018, from Australian Patent Application No. 2014388185, 3 pp.

* cited by examiner software 180 implementing one or more innovations for adjusting quantization/scaling or inverse quantization/scaling when switching color spaces

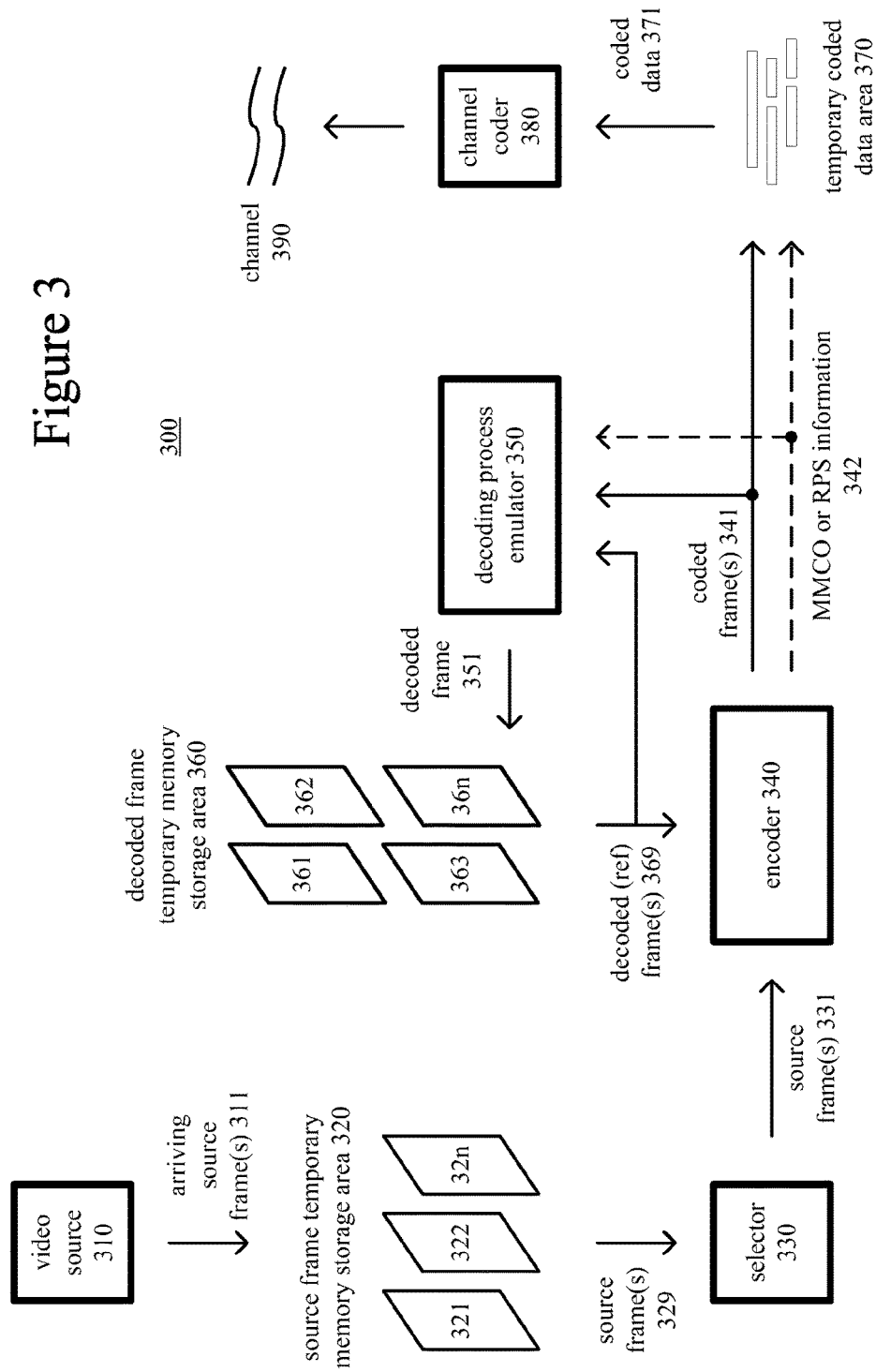

500 computer desktop environment (710) with content that
may provide input for screen capture composite video (820) with natural video
content and palette-based content picture-adaptive color space, color sampling rate and/
or bit depth for pictures in a sequence (900)

slice-adaptive color space, color sampling rate and/or
bit depth for picture (1000) in a sequence block-adaptive color space, color sampling rate and/or
bit depth for slice (1100) of a picture in a sequence

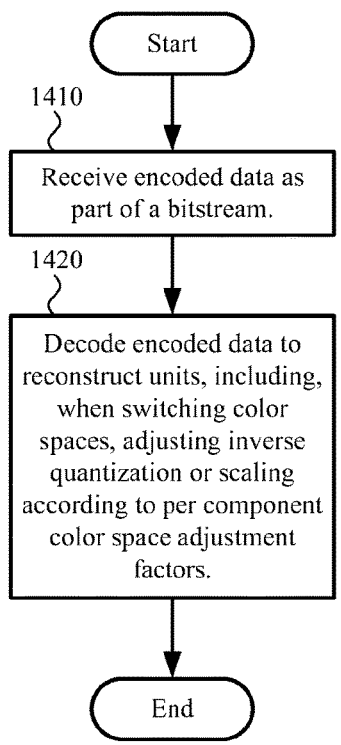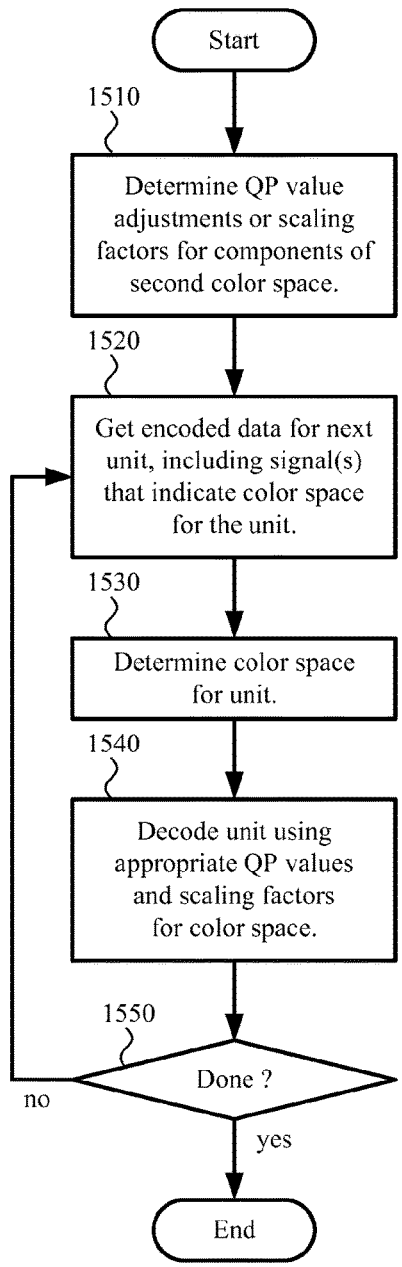

ADJUSTING QUANTIZATION/SCALING AND INVERSE QUANTIZATION/SCALING WHEN SWITCHING COLOR SPACES

CROSS REFERENCE TO RELATED APPLICATIONS

This is the U.S. National Stage of International Application No. PCT/CN2014/074197, filed Mar. 27, 2014, which was published in English under PCT Article 21(2), and which is incorporated by reference herein in its entirety

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

A video source such as a camera, animation output, screen capture module, etc. typically provides video in a particular color space. In general, a color space (sometimes called a color model) is a model for representing colors as n values per physical position, for n≥1, where each of the n values provides a color component value for that position. For example, in a YUV color space, a luma (or Y) component value represents an approximate brightness at a position and multiple chroma (or U and V) component values represent color differences at the position. Or, in an RGB color space, a red (R) component value represents a red intensity, a green (G) component value represents a green intensity, and a blue (B) component value represents a blue intensity at a position. Historically, different color spaces have advantages for different applications such as display, printing, broadcasting and encoding/decoding. Sample values can be converted between color spaces using color space transformation operations.

Many commercially available video encoders and decoders support only a YUV format. Other commercially available encoders and decoders (e.g., for the H.264/AVC standard or H.265/HEVC standard) allow an encoder to specify a color space for a given sequence. The specified color space is used for the entire video sequence. These approaches do not provide sufficient flexibility for a general-purpose codec system that may process very different kinds of video content within a single video sequence. More recently, approaches to switching between color spaces during encoding or decoding have been considered, but these approaches do not adequately account for variation in the effects of quantization performed in different color spaces.

SUMMARY

In summary, the detailed description presents innovations in the area of adaptive encoding and decoding. For example, some of the innovations relate to adjustment of quantization or scaling when an encoder switches color spaces between units within a video sequence during encoding. Other innovations relate to adjustment of inverse quantization or scaling when a decoder switches color spaces between units within a video sequence during decoding. These innovations can improve coding efficiency when switching between color spaces during encoding and decoding.

According to one aspect of the innovations described herein, an image or video encoder encodes units (e.g., pictures, slices, coding units, blocks) of an image or video to produce encoded data. As part of the encoding, when switching from a first color space to a second color space between two of the units (e.g., from an RGB-type color space to a YUV-type color space, or from a YUV-type color space to an RGB-type color space), the encoder adjusts quantization or scaling for color components of the second color space according to per component color space adjustment factors. The encoder outputs the encoded data as part of a bitstream.

According to another aspect of the innovations described herein, an image or video decoder receives encoded data as part of a bitstream and decodes the encoded data to reconstruct units (e.g., pictures, slices, coding units, blocks) of an image or video. As part of the decoding, when switching from a first color space to a second color space between two of the units (e.g., from an RGB-type color space to a YUV-type color space, or from a YUV-type color space to an RGB-type color space), the decoder adjusts inverse quantization or scaling for color components of the second color space according to per component color space adjustment factors.

In general, the per component color space adjustment factors compensate for amplification of energy of quantization error when converting from the second color space back to the first color space. Otherwise, if quantization parameter ("QP") values and scaling factors from the first color space are simply applied to sample values in the second color space, quantization error in the second color space is amplified by the inverse color space conversion operations back to the first color space. This can create a perceptible mismatch in the levels of energy of quantization error between units that are converted to the second color space for encoding and units that are not converted to the second color space for encoding.

For example, one or more syntax elements in the bitstream can indicate the per component color space adjustment factors. The syntax element(s) can be signaled at picture level, slice level, a syntax level for a coding unit or block, or some other syntax level. The syntax element(s) can include a syntax element that indicates a QP value for a first color component of the second color space as well as syntax elements that indicate offsets for second and third color components of the second color space.

Or, instead of being indicated by syntax elements in the bitstream, the per component color space adjustment factors for the color components of the second color space can be derived by rule depending on the second color space. For example, the encoder and decoder automatically determine the per component color space adjustment factors starting from the QP values for the first color space, and making adjustments depending on the identity of the second color space.

The act of adjusting quantization or inverse quantization can include adjusting final QP values or intermediate QP values for the color components of the second color space. For example, if the first color space is RGB and the second color space is YCoCg, the per component color space adjustment factors can be −5, −3 and −5 for Y, Co and Cg components, respectively. More generally, the per component color space adjustment factors for quantization and inverse quantization can depend on energy amplification for the respective color components of the second color space in inverse color space conversion operations.

The adjusted scaling during encoding or decoding can include scaling transform coefficients using the per component color space adjustment factors. The scaling can use integer-only operations or floating point operations. The per component color space adjustment factors can be incorporated into a list of scaling factor or be separately applied. For example, if the first color space is RGB and the second color space is YCoCg, the per component color space adjustment factors can be approximately 1.78, 1.41 and 1.78 for Y, Co and Cg components, respectively. More generally, the per component color space adjustment factors for the scaling can depend on energy amplification for the respective color components of the second color space in inverse color space conversion operations. Or, the adjusted scaling during encoding or decoding can involve applying different scaling lists for different color components of the second color space.

Or, for changes during encoding that do not require corresponding changes during decoding, to adjust quantization, the encoder can set per component QP values on a unit-by-unit basis. In this case, the bitstream includes syntax elements that indicate the per component QP values for the respective units.

The innovations for adjusting quantization/scaling or inverse quantization/scaling can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 14 is a flowchart illustrating a generalized technique for adjusting inverse quantization or scaling when switching color spaces during decoding, and FIG. 15 is a flowchart illustrating a more detailed example technique for adjusting inverse quantization or scaling when switching color spaces on a unit-by-unit basis during decoding.

DETAILED DESCRIPTION

The detailed description presents innovations in the area of adaptive encoding and decoding. For example, some of the innovations relate to adjustment of quantization or scaling when an encoder switches color spaces between units within a video sequence during encoding. Other innovations relate to adjustment of inverse quantization or scaling when a decoder switches color spaces between units within a video sequence during decoding. These innovations can improve coding efficiency when switching between color spaces during encoding and decoding.

Although operations described herein are in places described as being performed by a video encoder or video decoder, in many cases the operations can be performed by another type of media processing tool (e.g., image encoder or decoder). For example, the operations can be performed for applications such as still-image coding or decoding, medical scan content coding or decoding, multispectral imagery content coding or decoding, etc.

Some of the innovations described herein are illustrated with reference to syntax elements and operations specific to the H.265/HEVC standard. For example, reference is made to the draft version JCTVC-P1005 of the H.265/HEVC standard—"High Efficiency Video Coding (HEVC) Range Extensions Text Specification: Draft 6," JCTVC-P1005_v1, February 2014, and to JCTVC-P1003, "High Efficiency Video Coding (HEVC) Defect Report 3," JCTVC-P1003_v1, February 2014. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
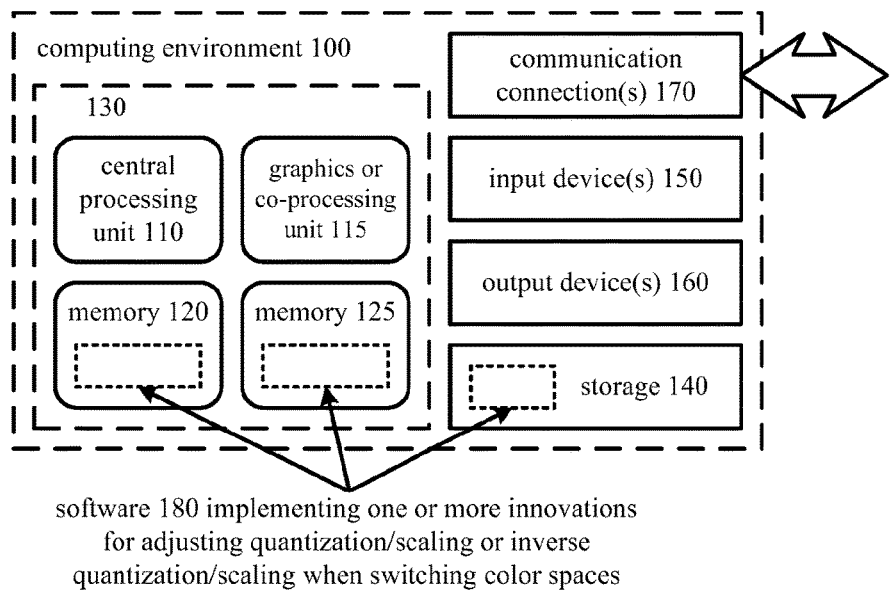
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for adjusting quantization/scaling or inverse quantization/scaling when switching color spaces, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for adjusting quantization/scaling or inverse quantization/scaling when switching color spaces.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
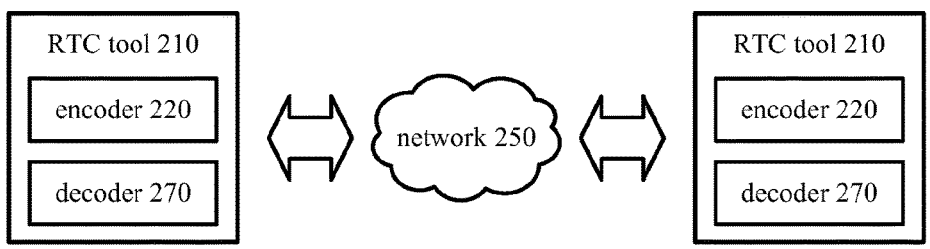
FIGS. 2a and 2b are diagrams of example network environments in which some described embodiments can be implemented.
Figure 2B:
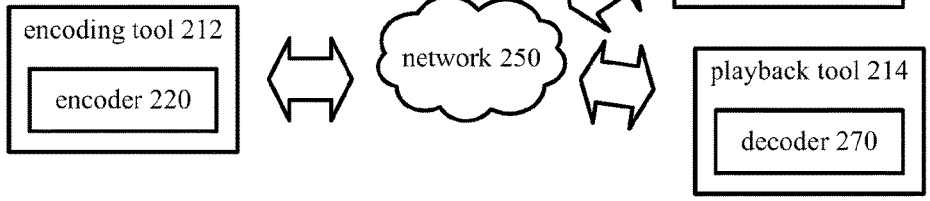

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 4:
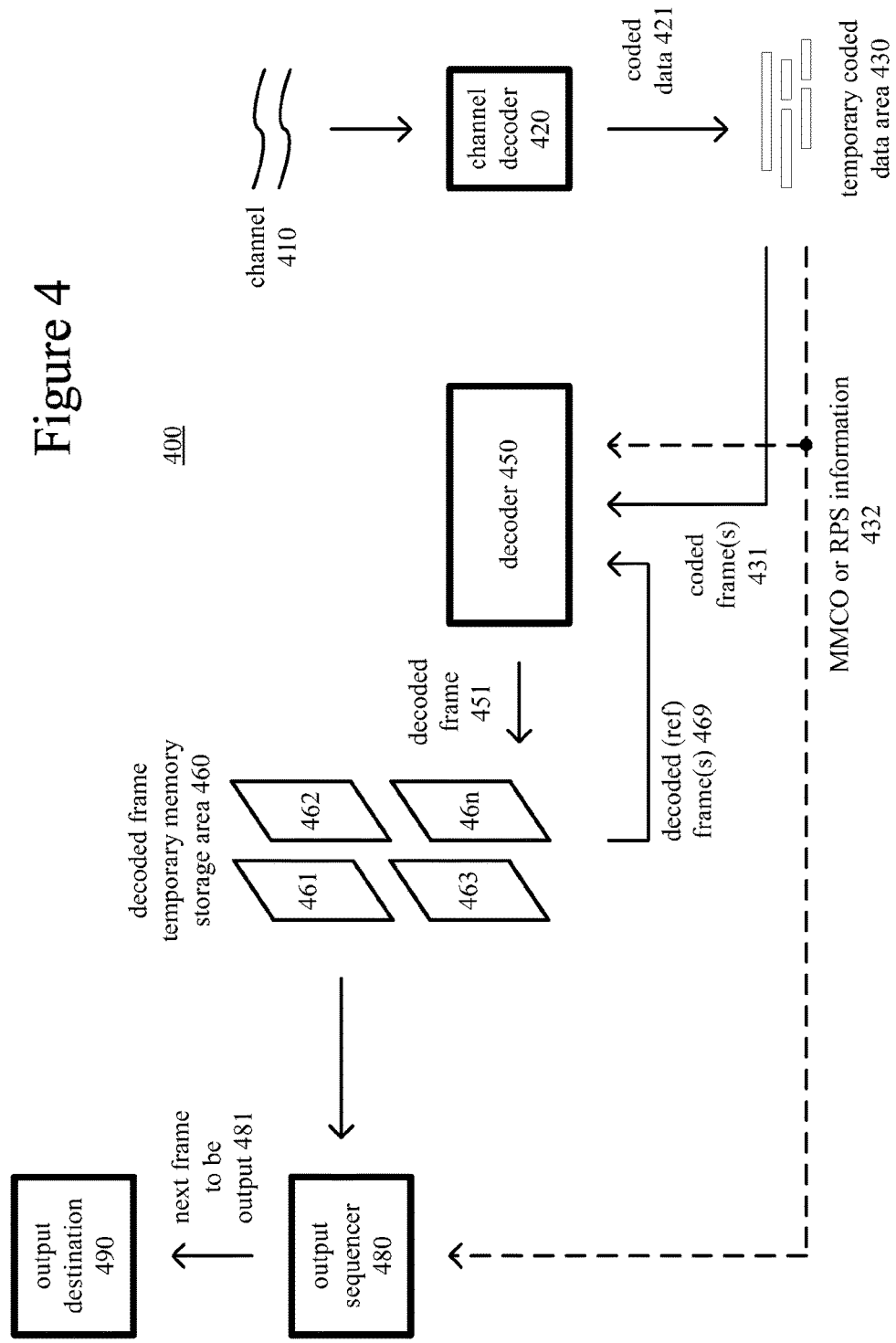
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, screen capture module, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content), or it can be adapted for encoding of any of several different types of content (e.g., screen capture content and natural video). The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded with adaptive switching of color spaces, color sampling rates and/or bit depths.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding.

The encoder (340) encodes the selected frame (331) to produce a coded frame (341) and also produces memory management control operation ("MMCO") signals (342) or reference picture set ("RPS") information. The RPS is the set of frames that may be used for reference in motion compensation for a current frame or any subsequent frame. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

The encoder (340) accepts video in a particular color space (e.g., a YUV-type color space, an RGB-type color space), with a particular color sampling rate (e.g., 4:4:4) and a particular number of bits per sample (e.g., 12 bits per sample). During encoding, for different pictures, slices, blocks or other units of video, the encoder (340) can perform color space conversions to transform between a YUV-type color space and an RGB-type color space, or to/from some other color space. The encoder (340) can also perform color space conversions to reorder color components, changing which color component is the primary component (e.g., converting between RGB, BGR and GBR formats). In typical implementations, the encoder (340) is adapted to encode the primary component more carefully than the secondary components in various respects (e.g., more options for coding modes, potentially lower quantization step size). By making the color component with the most information content or energy the primary color component, the encoder can improve overall coding efficiency. During encoding, the encoder (340) can also perform resampling processing to change color sampling rates (e.g., between 4:4:4, 4:2:2 and 4:2:0 formats) for different pictures, slices, blocks or other units of video. The encoder (340) can also change bit depths (e.g., between 12 bits per sample, 10 bits per sample and 8 bits per sample) during encoding for different pictures, slices, blocks or other units of video. In some example implementations, the encoder (340) can switch color spaces, color sampling rates and/or bit depths on a picture-by-picture basis during encoding. When the encoder (340) switches color spaces during encoding, the encoder (340) can adjust quantization or scaling, as described herein, to compensate for amplification of energy of quantization error in inverse color space conversion operations.

Generally, the encoder (340) includes multiple encoding modules that perform encoding tasks such as partitioning into tiles, adaptation of color space, color sampling rate and/or bit depth, intra prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of sample values for purposes of encoding and decoding. In some example implementations, the encoder (340) can switch color spaces, color sampling rates and/or bit depths on a slice-by-slice basis during encoding. In some example implementations, the encoder (340) can set quantization parameter ("QP") values on a slice-by-slice basis.

For syntax according to the H.265/HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a luma transform block ("TB") and two chroma TBs. A PU in an intra-predicted CU may contain a single TU (equal in size to the PU) or multiple TUs. The encoder decides how to partition video into CTUs, CUs, PUs, TUs, etc. In some example implementations, the encoder (340) can switch color spaces, color sampling rates and/or bit depths on a unit-by-unit basis during encoding for CTUs, CUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice header includes values of syntax elements that apply for the independent slice segment. For a dependent slice segment, a truncated slice header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, prediction unit, residual data unit, or a CB, PB or TB, or some other set of sample values, depending on context. In some example implementations, the encoder (340) can switch color spaces, color sampling rates and/or bit depths on a block-by-block basis during encoding.

Returning to FIG. 3, the encoder represents an intra-coded block of a source frame (331) in terms of prediction from other, previously reconstructed sample values in the frame (331). For intra block copy ("BC") prediction, an intra-picture estimator estimates displacement of a block with respect to the other, previously reconstructed sample values. An intra-frame prediction reference region is a region of sample values in the frame that are used to generate BC-prediction values for the block. The intra-frame prediction region can be indicated with a block vector ("By") value (determined in BV estimation). For intra spatial prediction for a block, the intra-picture estimator estimates extrapolation of the neighboring reconstructed sample values into the block. The intra-picture estimator can output prediction information (such as BV values for intra BC prediction, or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). When multiple reference frames are used, the multiple reference frames can be from different temporal directions or the same temporal direction. A motion-compensated prediction reference region is a region of sample values in the reference frame(s) that are used to generate motion-compensated prediction values for a block of sample values of a current frame. The motion estimator outputs motion information such as motion vector ("MV") information, which is entropy coded. A motion compensator applies MVs to reference frames (369) to determine motion-compensated prediction values for inter-frame prediction.

The encoder can determine the differences (if any) between a block's prediction values (intra or inter) and corresponding original values. These prediction residual values are further encoded using a frequency transform, quantization and entropy encoding. For example, the encoder (340) sets values for QP for a picture, slice, coding unit and/or other portion of video, and quantizes transform coefficients accordingly. To compensate for amplification of the energy of quantization error in inverse color space conversion operations, the encoder (340) can adjust quantization or scaling as described herein. The entropy coder of the encoder (340) compresses quantized transform coefficient values as well as certain side information (e.g., MV information, index values for BV predictors, BV differentials, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. In some example implementations, a PPS can include one or more signals indicating a color space, color sampling rate and/or bit depth that apply for a picture (or multiple pictures that use the PPS), as well as other information identifying or defining available color spaces, available color sampling rates and/or available bit depths. In some example implementations, a PPS can include one or more syntax elements that indicate QP values (e.g., an initial QP value for a picture, an initial QP value or offset for a QP value for a second color space). A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. A SPS is typically signaled separate from other data for the sequence, and a syntax element in the other data indicates which SPS to use. In some example implementations, an SPS for a sequence can include information identifying or defining available color spaces, available color sampling rates and/or available bit depths, which is referenced when switching color spaces, color sampling rates and/or bit depths within the sequence.

For slice layer, a slice header (e.g., slice segment header) includes values of syntax elements that apply for a slice (e.g., an independent slice segment and any dependent slice segments that follow). In some example implementations, a slice header can include one or more signals indicating a color space, color sampling rate and/or bit depth that apply for a slice. In some example implementations, a slice header can also include information identifying or defining available color spaces, available color sampling rates and/or available bit depths, which is referenced when switching color spaces, color sampling rates and/or bit depths within the slice. In some example implementations, a slice header can include one or more syntax elements for QP values (e.g., an offset for a QP value for a slice, offsets for QP values for color components of the slice, an offset for a second color space, offsets for color components of the second color space). For block layer (e.g., for a CTU), a syntax structure includes values of syntax elements that apply for a block. In some example implementations, the syntax structure for a block can include one or more signals indicating a color space, color sampling rate and/or bit depth that apply for the block, and may also include one or more syntax elements that indicate a QP value that applies for a block (or QP values that apply for different color spaces for the block).

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding processes emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames.

After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be adapted for decoding of a particular type of content (e.g., screen capture content), or it can be adapted for decoding of any of several different types of content (e.g., screen capture content and natural video). The decoder system (400) can be implemented as an operating system module, as part of an application library or as a standalone application. Overall, the decoder system (400) receives coded data from a channel (410) and produces reconstructed frames as output for an output destination (490). The coded data can include content encoded with adaptive switching of color spaces, color sampling rates and/or bit depths.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460).

During decoding, for different pictures, slices, blocks or other units of video, the decoder (450) can perform color space conversions to transform between a YUV-type color space and an RGB-type color space, or to/from some other color space. The decoder (450) can also perform color space conversions to reorder color components for different pictures, slices, blocks or other units of video, changing which color component is the primary component (e.g., converting between RGB, BGR and GBR formats). During decoding, the decoder (450) can also perform resampling processing to change color sampling rates and/or change bit depths for different pictures, slices, blocks or other units of video. In some example implementations, the decoder (450) can switch color spaces, color sampling rates and/or bit depths on a picture-by-picture basis during decoding. Alternatively, the decoder (450) can switch color spaces, color sampling rates and/or bit depths on a slice-by-slice basis, block-by-block or other unit-by-unit basis during decoding. When the decoder (450) switches color spaces during decoding, the decoder (450) can adjust inverse quantization or scaling, as described herein, to compensate for amplification of energy of quantization error in inverse color space conversion operations.

Generally, the decoder (450) includes multiple decoding modules that perform decoding tasks such as entropy decoding, adaptation of color space, color sampling rate and/or bit depth, intra-frame prediction, motion-compensated inter-frame prediction, inverse quantization, inverse frequency transforms, and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra-frame prediction module can spatially predict sample values of a current block from neighboring, previously reconstructed sample values or, for intra BC prediction, predict sample values of a current block using previously reconstructed sample values of an intra-frame prediction reference region in the frame. The reference region can be indicated with a BV value. The decoder (450) also reconstructs prediction residual values. An inverse quantizer inverse quantizes entropy-decoded data. For example, the decoder (450) sets values for QP for a picture, slice, coding unit and/or other portion of video based on syntax elements in the bitstream, and inverse quantizes transform coefficients accordingly. To compensate for amplification of the energy of quantization error in inverse color space conversion operations, the decoder (450) can adjust inverse quantization or scaling as described herein. An inverse frequency transformer converts the quantized, frequency-domain data into spatial-domain data. For an inter-frame predicted block, the decoder (450) combines reconstructed prediction residual values with motion-compensated prediction values. The decoder (450) can similarly combine prediction residual values with prediction values from intra prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering; not shown) can alternatively or additionally be applied as in-loop filtering operations.

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders.

Figure 5A:
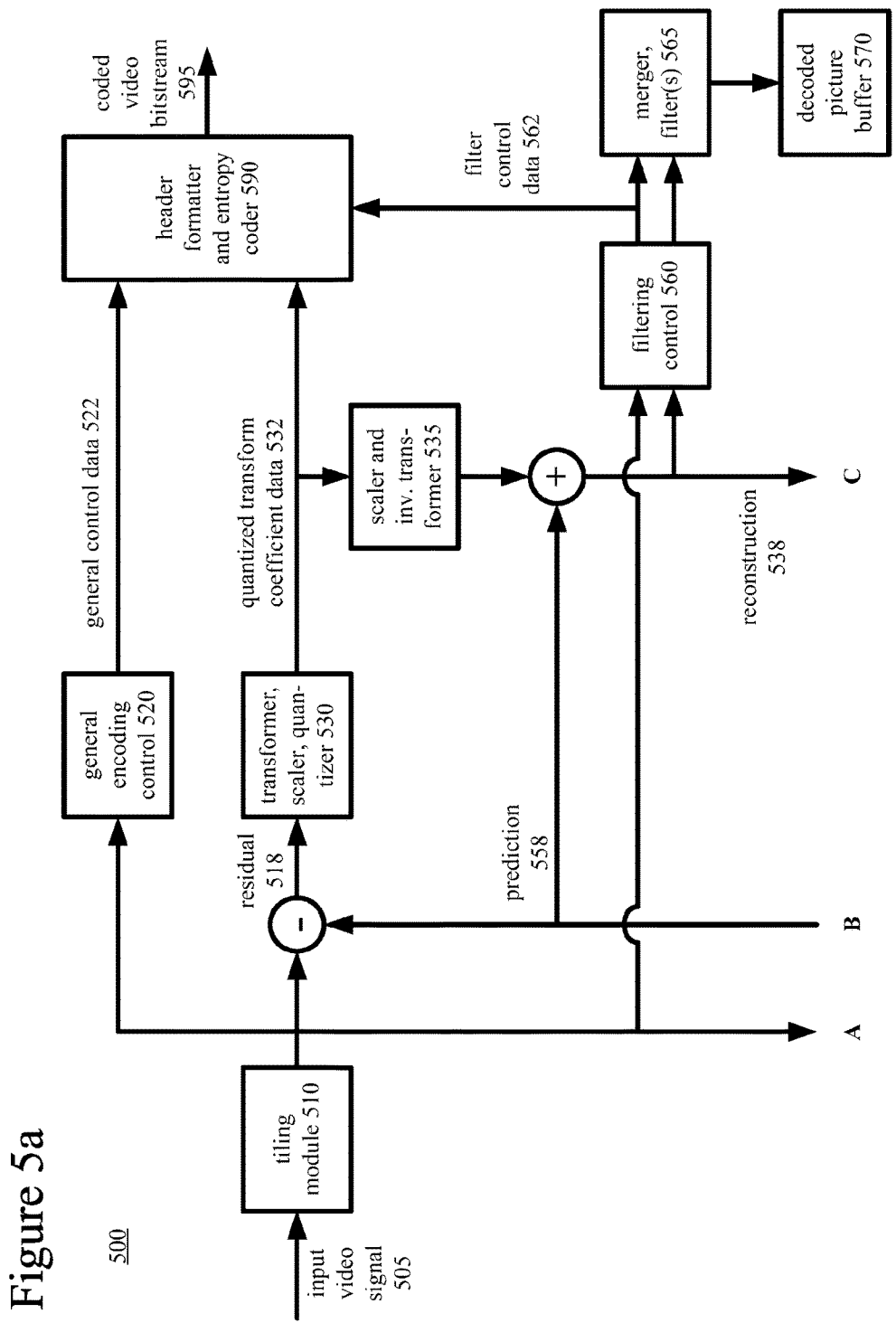
FIGS. 5a and 5b are diagrams illustrating an example video encoder in conjunction with which some described embodiments can be implemented.
Figure 5B:
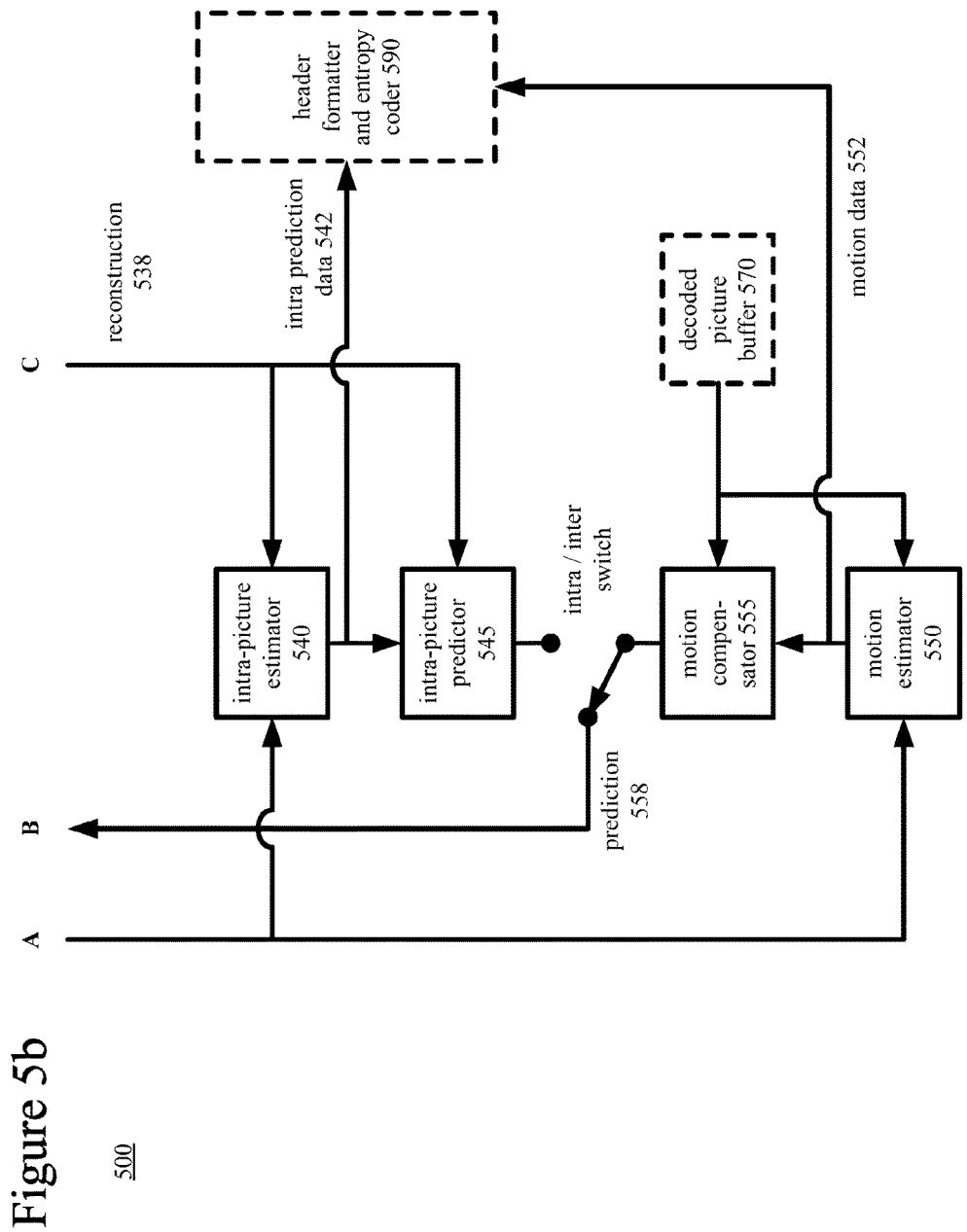

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. In H.265/HEVC implementations, the encoder (500) partitions a picture into one or more slices, where each slice includes one or more slice segments.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide how to adaptively switch color spaces, color sampling rates and/or bit depths during encoding on a picture-by-picture basis, slice-by-slice basis, block-by-block basis or some other unit-by-unit basis. When the encoder (500) switches color spaces, the general encoding control (520) can determine how to adjust quantization or scaling to compensate for amplification of energy of quantization error in inverse color space conversion operations. The general encoding control (520) can also evaluate intermediate results during encoding. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of the current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values, and reference picture selection data. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture. When the secondary components for a picture have the same resolution as the primary component (e.g. when the format is YUV 4:4:4 format or RGB 4:4:4 format), the MV value that is applied for a secondary component block may be the same as the MV value applied for the corresponding primary component block. On the other hand, when the secondary components for a picture have reduced resolution relative to the primary component (e.g. when the format is YUV 4:2:0 format), the MV value that is applied for a secondary component block may be scaled down and possibly rounded to adjust for the difference in resolution (e.g. by dividing the vertical and horizontal components of the MV value by two and truncating or rounding them to integer values).

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. Or, for intra BC prediction using BV values, the intra-picture estimator (540) estimates displacement of the sample values of the current block to different candidate reference regions within the current picture.

The intra-picture estimator (540) produces as side information intra prediction data (542), such as information indicating whether intra prediction uses spatial prediction or intra BC prediction (e.g., a flag value per intra block), prediction mode direction (for intra spatial prediction), and BV values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of the current block using previously reconstructed sample values of an intra-picture prediction reference region, which is indicated by a BV value for the current block. In some cases, the BV value can be a BV predictor (predicted BV value). In other cases, the BV value can be different than its predicted BV value, in which case a BV differential indicates the difference between the predicted BV value and BV value. When the secondary components for a picture have the same resolution as the primary component (e.g. when the format is YUV 4:4:4 format or RGB 4:4:4 format), the BV value that is applied for a secondary component block may be the same as the BV value applied for the corresponding primary component block. On the other hand, when the secondary components for a picture have reduced resolution relative to the primary component (e.g. when the format is YUV 4:2:0 format), the BV value that is applied for a secondary component block may be scaled down and possibly rounded to adjust for the difference in resolution (e.g. by dividing the vertical and horizontal components of the BV value by two and truncating or rounding them to integer values).

The intra/inter switch selects whether the prediction (558) for a given block will be a motion-compensated prediction or intra-picture prediction. The difference (if any) between a block of the prediction (558) and a corresponding part of the original current picture of the input video signal (505) provides values of the residual (518), for a non-skip-mode block. During reconstruction of the current picture, for a non-skip-mode block, reconstructed residual values are combined with the prediction (558) to produce an approximate or exact reconstruction (538) of the original content from the video signal (505). (In lossy compression, some information is lost from the video signal (505).)

In the transformer/scaler/quantizer (530), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies dead-zone scalar quantization to the frequency-domain data with a quantization step size that varies on a picture-by-picture basis, slice-by-slice basis, block-by-block basis, frequency-specific basis or other basis. To compensate for amplification of the energy of quantization error in inverse color space conversion operations, the scaler/quantizer can adjust quantization or scaling as described herein. The quantized transform coefficient data (532) is provided to the header formatter/entropy coder (590).

In the scaler/inverse transformer (535), a scaler/inverse quantizer performs inverse scaling and inverse quantization on the quantized transform coefficients. To compensate for amplification of the energy of quantization error in inverse color space conversion operations, the scaler can adjust inverse quantization or scaling as described herein. An inverse frequency transformer performs an inverse frequency transform, producing blocks of reconstructed prediction residual values or sample values. For a non-skip-mode block, the encoder (500) combines reconstructed residual values with values of the prediction (558) (e.g., motion-compensated prediction values, intra-picture prediction values) to form the reconstruction (538). For a skip-mode block, the encoder (500) uses the values of the prediction (558) as the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). The general control data (522) includes signals indicating color spaces, color sampling rates and/or bit depths for pictures, slice, blocks, or other units of the video. Such signals can be included, for example, in a PPS, slice header, block syntax structure or other syntax structure, and can be entropy coded or signaled as fixed length values. The header formatter/entropy coder (590) can also format and/or entropy code information identifying or defining available color spaces (e.g., list of pre-defined color spaces, custom matrices for color space transformation operations), information identifying or defining available color sampling rates (e.g., list of pre-defined color sampling rates, other color sampling rates, or identification of operations for downsampling and upsampling) and/or information identifying or defining available bit depths (e.g., list of pre-defined bit depths, other bit depths, or identification of operations for bit depth conversion), which is usable by a decoder during adaptive switching. The header formatter/entropy coder (590) can also format and/or entropy code syntax elements that indicate QP values, for example, in a PPS, slice header, block syntax structure or other syntax structure.

The header formatter/entropy coder (590) provides the encoded data in the coded video bitstream (595). The format of the coded video bitstream (595) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of an encoder (500) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

Figure 6:
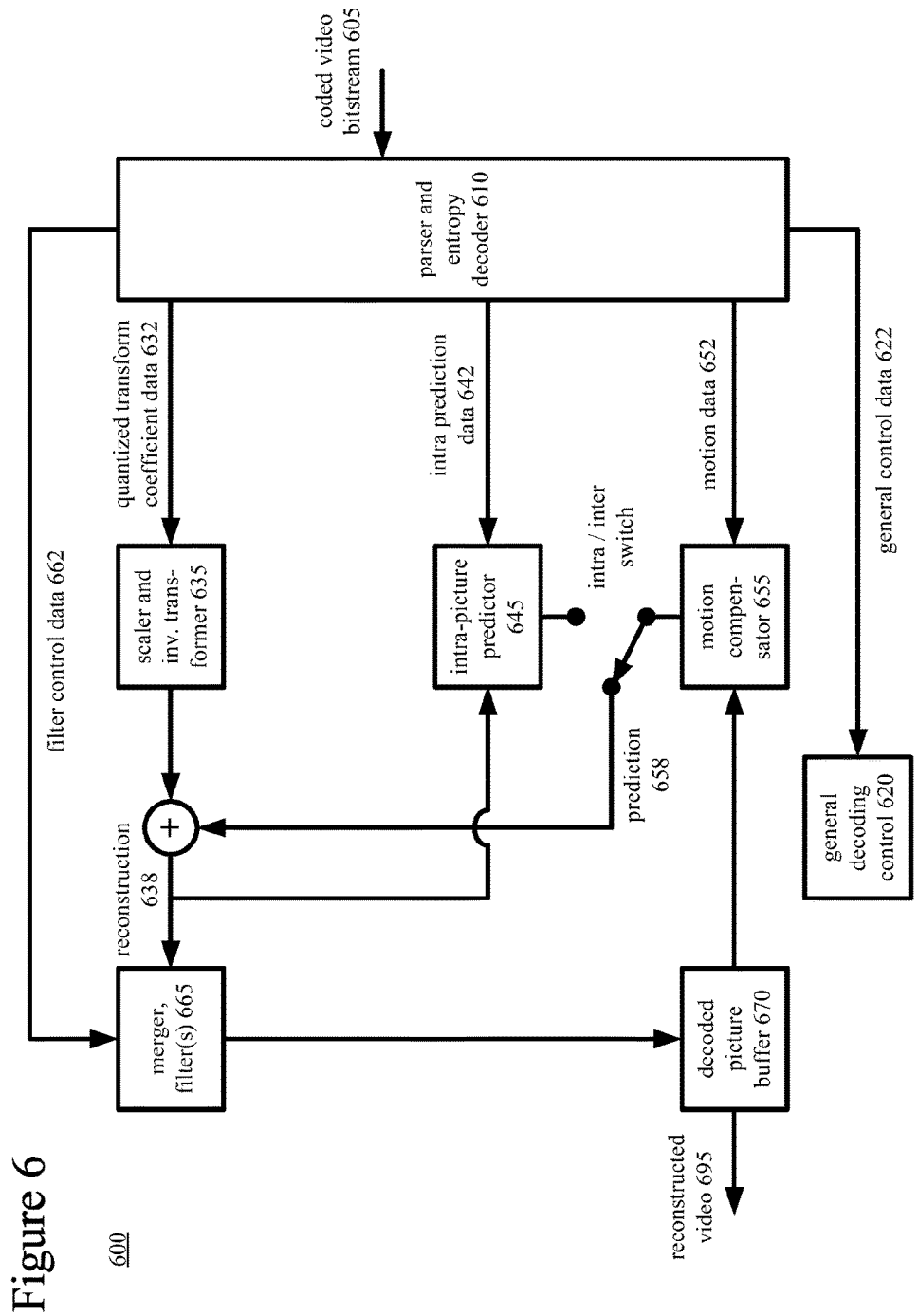
FIG. 6 is a diagram illustrating an example video decoder in conjunction with which some described embodiments can be implemented.

FIG. 6 is a block diagram of a generalized decoder (600) in conjunction with which some described embodiments may be implemented. The decoder (600) receives encoded data in a coded video bitstream (605) and produces output including pictures for reconstructed video (695). The format of the coded video bitstream (605) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the H.265/HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). The general control data (622) includes signals indicating color spaces, color sampling rates and/or bit depths for pictures, slice, blocks, or other units of video. Such signals can be included, for example, in a PPS, slice header, block syntax structure or other syntax structure, and can be entropy coded or signaled as fixed length values. The parser/entropy decoder (610) can also parse and/or entropy decode information identifying or defining available color spaces (e.g., list of pre-defined color spaces, custom matrices for color space transformation operations), information identifying or defining available color sampling rates (e.g., list of pre-defined color sampling rates, other color sampling rates, or identification of operations for downsampling and upsampling) and/or information identifying or defining available bit depths (e.g., list of pre-defined bit depths, other bit depths, or identification of operations for bit depth conversion), which is usable by the decoder (600) during adaptive switching. The parser/entropy decoder (610) can also parse and/or entropy decode syntax elements that indicate QP values, for example, from a PPS, slice header, block syntax structure or other syntax structure.

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding. In particular, the general decoding control (620) can cause the decoder (600) to switch color spaces, color sampling rates and/or bit depths during decoding on a picture-by-picture basis, slice-by-slice basis, block-by-block basis or some other unit-by-unit basis. When the encoder (600) switches color spaces, the general decoding control (620) can determine how to adjust inverse quantization or scaling to compensate for amplification of energy of quantization error in inverse color space conversion operations.

If the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-picture prediction predictor (645) receives the intra prediction data (642), such as information indicating whether intra prediction uses spatial prediction or intra BC prediction (e.g., a flag value per intra block), prediction mode direction (for intra spatial prediction), and BV values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction using BV values, the intra-picture predictor (645) predicts the sample values of the current block using previously reconstructed sample values of an intra-picture prediction reference region, which is indicated by a BV value for the current block.

The intra/inter switch selects whether the prediction (658) for a given block is a motion-compensated prediction or intra-picture prediction. For example, when H.265/HEVC syntax is followed, the intra/inter switch can be controlled based on a syntax element encoded for a CU of a picture that can contain intra-predicted CUs and inter-predicted CUs. For a non-skip-mode block, the decoder (600) combines the prediction (658) with reconstructed residual values to produce the reconstruction (638) of the content from the video signal. For a skip-mode block, the decoder (600) uses the values of the prediction (658) as the reconstruction (638).

To reconstruct the residual for a non-skip-mode block, the scaler/inverse transformer (635) receives and processes the quantized transform coefficient data (632). In the scaler/inverse transformer (635), a scaler/inverse quantizer performs inverse scaling and inverse quantization on the quantized transform coefficients. To compensate for amplification of the energy of quantization error in inverse color space conversion operations, the scaler can adjust inverse quantization or scaling as described herein. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof).

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing filter. The post-processing filter (608) can include de-ringing filtering, adaptive Wiener filtering, film-grain reproduction filtering, SAO filtering or another kind of filtering.

Depending on implementation and the type of decompression desired, modules of a decoder (600) can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Adjusting Quantization/Scaling or Inverse Quantization/Scaling when Switching Color Spaces.

This section presents various features of adaptive encoding and decoding for units of a video sequence. A unit can be a picture, slice, block or other portion of the video sequence. For example, some of the features relate to adjustment of quantization or scaling when an encoder switches color spaces between units within a video sequence during encoding. Other features relate to adjustment of inverse quantization or scaling when a decoder switches color spaces between units within a video sequence during decoding. These features can improve coding efficiency when switching between color spaces during encoding and decoding.

In general, a color space (sometimes called a color model) is a model for representing colors as n values per physical position, for $n \geq 1$, where each of the n values provides a color component value for that position. For example, in a YUV color space, a luma (or Y) component value represents an approximate brightness at a position and multiple chroma (or U and V) component values represent color differences at the position. The precise definitions of the color difference values (and conversion operations to/from a YUV color space to another color space such as RGB) depend on implementation. Typically, for purposes of encoding and decoding, the Y component is the primary component, and the U and V components are secondary components. In general, as used herein, the term YUV-type color space indicates any color space with a luma (or luminance) component and one or more chroma (or chrominance) components, including Y'UV, YIQ, Y'IQ and YDbDr as well as variations such as YCbCr and YCoCg.

The component signal measures that are used may be adjusted through the application of a non-linear transfer characteristics function (generally known as "gamma precompensation" and often denoted by the use of a prime symbol, although the prime symbol is often omitted for typographical convenience). Or, the component signal measures may be in a domain that has a linear relationship with light amplitude. The luma and chroma component signals may be well aligned with the perception of brightness and color for the human visual system, or the luma and chroma component signals may somewhat deviate from such measures (e.g., as in the YCoCg variation, in which formulas are applied that simplify the computation of the color component values).

As another example, in an RGB color space, a red (R) component value represents a red intensity, a green (G) component value represents a green intensity, and a blue (B) component value represents a blue intensity at a position. As used herein, the term RGB-type color space indicates a color space with R, G and B color components in any order. Examples include RGB, BGR and GBR color spaces, which differ in terms of the primary component for purposes of encoding and decoding. The primary component is indicated with the first letter of the color space (e.g., R for RGB).

Color sampling rate (sometimes called chroma sampling rate) refers to the relative spatial resolution between color components. For example, for a color sampling rate of 4:4:4, information for secondary components (e.g., U and V components for YUV) has the same spatial resolution as information for a primary component (e.g., Y component for YUV). For a color sampling rate of 4:2:2 or 4:2:0, information for secondary components is downsampled relative to information for the primary component. A YUV 4:2:0 format is a format that sub-samples chroma information compared to a YUV 4:4:4 format, so that chroma resolution is half that of luma resolution both horizontally and vertically. A YUV 4:2:2 format is a format that sub-samples chroma information horizontally compared to a YUV 4:4:4 format, so that chroma resolution is half that of luma resolution horizontally. Other examples of color sampling rates are 4:1:1 (secondary components have quarter resolution horizontally) and 4:0:0 (secondary components dropped). Color sub-sampling is typically applied to YUV-type color spaces. RGB-type color spaces usually have a color sampling rate of 4:4:4, but can have a different color sampling rate according to which secondary color components are sub-sampled.

Although YUV 4:2:0 format is conventionally used for video encoding and decoding, there are some use cases for which video has richer color information, and higher color fidelity may be justified. In such use cases, the differences between YUV 4:4:4 and YUV 4:2:0 chroma sampling formats are more easily perceived by viewers. For example, for encoding/decoding of computer screen text content, animated video content with artificial hard-edged boundaries, or certain features of video content more generally (such as scrolling titles and hard-edged graphics, or video with information concentrated in chroma channels), a 4:4:4 format may be preferable to a 4:2:0 format.

Bit depth refers to the number of bits per sample value. Common bit depths are 8 bits per sample, 10 bits per sample and 12 bits per sample. Other possible bit depths include 4-bits per sample and 16 bits per sample.

Adaptive switching of color spaces, color sampling rates and/or bit depths can improve rate-distortion performance when encoding certain "artificially" created video content such as screen-capture content, or when encoding a mix of natural video and artificially-created video content. Common scenarios for encoding/decoding of screen-capture content include remote desktop conferencing and encoding/decoding of graphical overlays on natural video or other "mixed content" video.

A. Types of Video.

Figure 7:
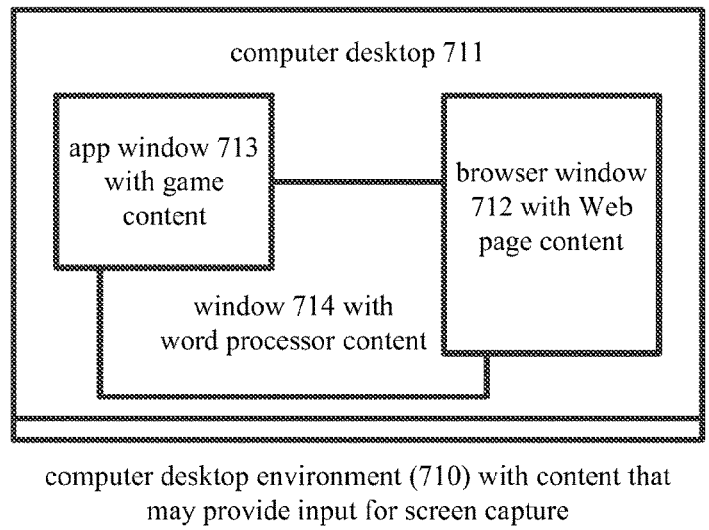
FIG. 7 is diagram illustrating a computer desktop environment with content that may provide input for screen capture.

In general, screen capture video represents the output of a computer screen or other display. FIG. 7 shows a computer desktop environment (710) with content that may provide input for screen capture. For example, screen capture video can represent a series of images of the entire computer desktop (711). Or, screen capture video can represent a series of images for one of the windows of the computer desktop environment, such as the app window (713) including game content, browser window (712) with Web page content or window (714) with word processor content.

As computer-generated, artificially-created video content, screen capture video tends to have relatively few discrete sample values, compared to natural video content that is captured using a video camera. For example, a region of screen capture content often includes a single uniform color, whereas a region in natural video content more likely includes colors that gradually vary. Also, screen capture content typically includes distinct structures (e.g., graphics, text characters) that are exactly repeated from frame-to-frame, even if the content may be spatially displaced (e.g., due to scrolling). Screen capture content is often encoded in a format (e.g., YUV 4:4:4 or RGB 4:4:4) with high chroma sampling resolution, although it may also be encoded in a format with lower chroma sampling resolution (e.g., YUV 4:2:0, YUV 4:2:2).

Figure 8:
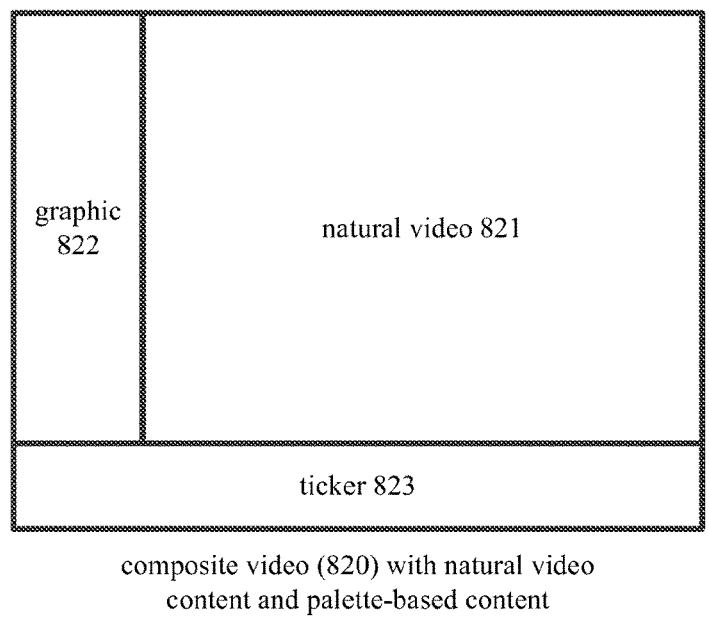
FIG. 8 is a diagram illustrating composite video with natural video content and artificial video content.

FIG. 8 shows composite video (820) that includes natural video (821) and artificially-created video content. The artificially-created video content includes a graphic (822) beside the natural video (821) and ticker (823) running below the natural video (821). Like the screen capture content shown in FIG. 7, the artificially-created video content shown in FIG. 8 tends to have relatively few discrete sample values. It also tends to have distinct structures (e.g., graphics, text characters) that are exactly repeated from frame-to-frame (e.g., due to scrolling).

B. Examples of Adaptive Switching.

For adaptive switching of color spaces, different units of video in a sequence are encoded in different color spaces. For example, some of the units are encoded in a YUV-type color space (e.g., YCbCr, YCoCg), and other units are encoded in an RGB-type color space (e.g., RGB, BGR, GBR). In this case, an encoder or decoder, as appropriate, performs color space transformation operations on sample values to switch between a YUV-type color space and an RGB-type color space. Typically, color space transformation operations can be represented as matrix multiplication operations performed on a position-by-position basis, where n sample values in a first color space for a position are multiplied by an n×n matrix to produce n sample values in a second color space for the position. In practice, color space transformation operations can be implemented using other arithmetic.

As another example of adaptive switching of color spaces, different units can be encoded in different RGB-type color spaces, which differ in terms of their primary component and the order that components are signaled (e.g., for residual data). In this case, an encoder or decoder, as appropriate, performs color space reordering operations on blocks or planes of sample values to change which color component is the primary color component.

In some example implementations, for lossy coding, an encoder can switch between any of the different color spaces. For lossless coding, however, an encoder only performs invertible color space conversions (e.g., reordering color components between RGB, BGR and GBR color spaces, or, in some implementations, conversion to/from YCoCg using an increased intermediate bit depth).

For adaptive switching of color sampling rates, different units of video in a sequence are encoded with different color sampling rates. For example, some of the units are encoded in a 4:2:2 or 4:2:0 format (such as YUV 4:2:2 or YUV 4:2:0), while other units are encoded in a 4:4:4 format (such as YUV 4:4:4). An RGB-type color space usually has a color sampling rate of 4:4:4, but its color components can instead be sub-sampled according to a color sampling rate of 4:2:2 or 4:2:0, e.g., if the primary color component is much more dominant than the secondary color components.

When downsampling sample values for a secondary component horizontally or vertically, an encoder or decoder can perform simple sub-sampling, low-pass filtering plus sub-sampling, or other filtering plus sub-sampling. For corresponding upsampling of the sample values of the secondary component, an encoder or decoder reverses the sub-sampling using, e.g., sample value repetition and/or filtering.

For adaptive switching of bit depths, different units of video in a sequence are encoded with different bit depths. For example, some of the units are encoded with 12-bit sample values, while other units are encoded with 10-bit sample values or 8-bit sample values. When converting between bit depths, an encoder or decoder can truncate higher-bit-depth sample values (with or without addition of a rounding factor) to produce lower-bit-depth sample values, or scale lower-bit-depth sample values to produce higher-bit-depth sample values.

An encoder typically receives input video in a given format such as RGB 4:4:4 with 12-bit sample values. The encoder can convert between the input format and another format (with a different color space, different color sampling rate and/or different bit depth) for a given unit of the video. Color space adaptation can be performed at picture-level, slice-level, block-level or some other level, by itself or in combination with color sampling rate adaptation and/or bit depth adaptation. Similarly, color sampling rate adaptation can be performed at picture-level, slice-level, block-level or some other level, by itself or in combination with color space adaptation and/or bit depth adaptation. Bit depth adaptation can be performed at picture-level, slice-level, block-level or some other level, by itself or in combination with color space adaptation and/or color sampling rate adaptation.

Figure 9:
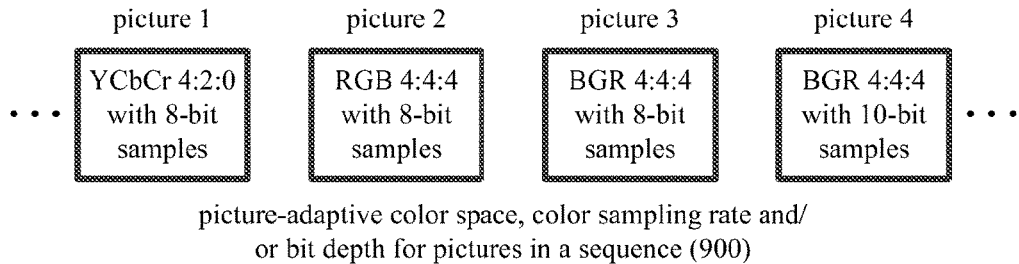
FIG. 9 is a diagram illustrating picture-adaptive color spaces, color sampling rates and/or bit depths for pictures in a sequence.

FIG. 9 shows picture-adaptive color spaces, color sampling rates and/or bit depths for pictures in a sequence (900). The sequence (900) includes a series of pictures. As needed, the encoder converts input video from the input video format to the format selected for a given picture. The format of picture 1 is YCbCr 4:2:0 with 8-bit sample values, and the format of picture 2 is RGB 4:4:4 with 8-bit sample values. Pictures 3 and 4 are BGR 4:4:4 video, but their sample values have different bit depths.

Figure 10:
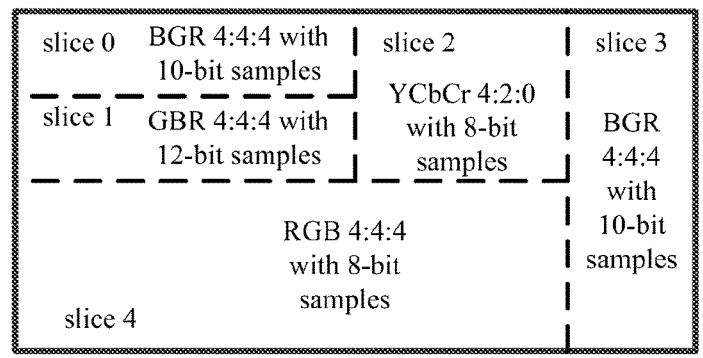
FIG. 10 is a diagram illustrating slice-adaptive color spaces, color sampling rates and/or bit depths for slices of a picture in a sequence.

FIG. 10 shows slice-adaptive color spaces, color sampling rates and/or bit depths for slices of a picture (1000) in a sequence. The picture (1000) includes five slices, whose boundaries are shown in dashed lines. For example, slices 0, 1, 3 and 4 could be associated with screen capture content or other artificially-created video content, while slice 2 is associated with natural video content. The format of slices 0 and 3 is BGR 4:4:4 with 10-bit sample values. Slice 1 includes 12-bit sample values of GBR 4:4:4 video. The format of slice 2 is YCbCr 4:2:0 with 8-bit sample values, and the format of slice 4 is RGB 4:4:4 with 8-bit sample values.

Figure 11:
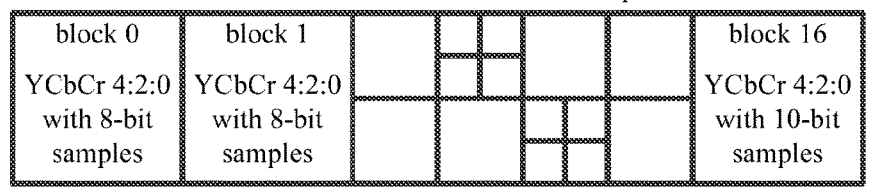
FIG. 11 is a diagram illustrating block-adaptive color spaces, color sampling rates and/or bit depths for blocks of a slice of a picture in a sequence.

FIG. 11 shows block-adaptive color spaces, color sampling rates and/or bit depths for blocks of a slice (1100) of a picture in a sequence. The slice (1100) includes 16 blocks having three different block sizes. The format of the first two blocks is YCbCr 4:2:0 with 8-bit sample values, and the format of the last block is YCbCr 4:2:0 with 10-bit sample values. Blocks 2-15 include 12-bit sample values in an RGB-type color space with a sampling rate of 4:4:4. The color space for blocks 2-5 varies between RGB, BGR and GBR.

C. Adjusting Quantization/Scaling and Inverse Quantization/Scaling when Switching Color Spaces—Introduction.

When an encoder adaptively switches color spaces between units of video, the encoder can adjust quantization and/or scaling. A corresponding decoder can adjust inverse quantization and/or scaling when the decoder switches color spaces between units of video. For example, the encoder and decoder can use different quantization step sizes for different color components when color space switching happens. Adjusting quantization/scaling during encoding and adjusting inverse quantization/scaling during corresponding decoding can improve coding efficiency when switching between color spaces.

Consider the example of adaptive switching between RGB and YCoCg color spaces on a block-by-block basis. In general, an encoder or decoder can convert sample values from RGB color space to YCoCg color space as shown in the following operation.

$$\begin{bmatrix} Y \\ Co \\ Cg \end{bmatrix} = \begin{bmatrix} 1 & 2 & 1 \\ 2 & 0 & -2 \\ -1 & 2 & -1 \end{bmatrix} \begin{bmatrix} R \\ G \\ B \end{bmatrix} \bigg/ 4$$

The dynamic range of the output sample values in YCoCg color space can be adjusted by adding an offset. For example, suppose the sample values for a position in RGB color space are $Ps_R$, $Ps_G$ and $Ps_B$, respectively, and the current bit depth is $\text{bit\_depth}_{current}$. The minimum sample value is 0, and the maximum sample value is $(1<<\text{bit\_depth}_{current})-1$ (e.g., 255 for 8-bit sample values). To adjust the dynamic range of Co and Cg, the term add value is defined as $1<<(\text{bit\_depth}_{current}-1)$ (e.g., 128 for 8-bit sample values, to keep output values in the range of 0 . . . 255). The sample values $Ps_Y$, $Ps_{Co}$, and $Ps_{Cg}$ for the position in YCoCg color space can be calculated by:

$Ps_Y = (Ps_R + (2*Ps_G) + Ps_B) >> 2$ $Ps_{Co} = ((Ps_R - Ps_B) >> 1) + \text{add\_value}$ $Ps_{Cg} = (((2*Ps_G) - Ps_R - Ps_B) >> 2) + \text{add\_value}$ The sample values $Ps_Y$, $Ps_{Co}$, and $Ps_{Cg}$ can be clipped in the range defined by the minimum sample value and maximum sample value.

In general, an encoder or decoder can convert sample values from YCoCg color space back to RGB color space as shown in the following operation.

$$\begin{bmatrix} R \\ G \\ B \end{bmatrix} = \begin{bmatrix} 1 & 1 & -1 \\ 1 & 0 & 1 \\ 0 & -1 & -1 \end{bmatrix} \begin{bmatrix} Y \\ Co \\ Cg \end{bmatrix}$$

If an offset was added to the sample values in YCoCg color space, the offset is first subtracted. For example, suppose the sample values for a position in YCoCg color space are $Rs_Y$, $Rs_{Co}$ and $Rs_{Cg}$, respectively, and the current bit depth is $\text{bit\_depth}_{current}$. To adjust dynamic range, the term add_value is defined as $1<<(\text{bit\_depth}_{current}-1)$ (e.g., 128 for 8-bit sample values, in the range of 0 . . . 255). The sample values $Rs_R$, $Rs_G$, and $Rs_B$ for the position in RGB color space can be calculated by:

$Rs_{Co} \mathrel{-}= \text{add\_value}$ $Rs_{Cg} \mathrel{-}= \text{add\_value}$ $Rs_R = Rs_Y + Rs_{Co} - Rs_{Cg}$ $Rs_G = Rs_Y + Rs_{Cg}$ $Rs_B = Rs_Y - Rs_{Co} - Rs_{Cg}$ The sample values $Rs_R$, $Rs_G$, and $Rs_B$ can be clipped in the range defined by the minimum sample value and maximum sample value.

According to the inverse color space conversion matrix, the sample value of the Y component will have an impact on the R, G and B sample values. The total energy contribution for it through the inverse color space conversions is $(1)^2+(1)^2+(1)^2=3$. The sample value of the Co component will have an impact on the R and B sample values, and the total energy contribution for it through the inverse color space conversions is $(1)^2+(0)^2+(-1)^2=2$. Similarly, the sample value of the Cg component will have an impact on the R, G and B sample values, and the total energy contribution for it through the inverse color space conversions is $(-1)^2+(1)^2+(-1)^2=3$. Thus, the ratio of the energy contributions for the Y, Co and Cg components is 3:2:3.

Due to the energy ratio, the energy of quantization error in the Y, Co and Cg components will be amplified by the inverse color space conversion operations. If blocks within a slice or picture have the same QP value, when blocks encoded in YCoCg color space are converted back to RGB color space, the energy of quantization error for those blocks (coded in the YCoCg domain then converted back to the RGB domain) will be amplified relative to the energy of quantization error for blocks that were encoded in RGB color space. To have comparable levels of energy of quantization error between the YCoCg-coded blocks and RGB-coded blocks, the encoder and decoder can adjust the QP values or scaling applied to the YCoCg-coded blocks, relative to the QP values or scaling applied to the RGB-coded blocks.

For example, suppose the QP value used for the R, G and B components of an RGB-coded block of a picture or slice is QP_RGB. For the Y component of a YCoCg-coded block of the picture or slice, the QP value is QP_Y. For a given value of QP_RGB, the quantization step size QSS is given by $QSS=2^{(QP\_RGB-4)/6}$. When QP_RGB increases by 1 or decreases by 1, the quantization step size increases or decreases by a factor of $2^{1/6}$. The energy of quantization error for a given QP value can generally be measured as a linear function of $QSS^2$. Thus, for QP_RGB, the energy of quantization error can be measured as $(2^{(QP\_RGB-4)/6})^2 = 2^{(QP\_RGB-4)/3}$. To have comparable levels of energy of quantization error between (a) blocks coded in the RGB domain and (b) blocks coded in the YCoCg domain then converted back to the RGB domain, the value of QP_Y is adjusted relative to the value of QP_RGB. Since the energy contribution from the Y component through the inverse color space conversions is $(1)^2+(1)^2+(1)^2=3$, the adjustment is calculated according to the following equations, starting by setting the energy of quantization error for RGB-coded blocks equal to the amplified energy of quantization error for YCoCg blocks.

$$2^{(QP\_RGB-4)/3}=3*2^{(QP\_Y-4)/3}$$

$$\log_2(2^{(QP\_RGB-4)/3})=\log_2(3)+\log_2(2^{(QP\_Y-4)/3})$$

$$(QP\_RGB-4)/3=\log_2(3)+(QP\_Y-4)/3$$

$$QP\_Y=QP\_RGB-3*\log_2(3)=QP\_RGB-4.755 \approx QP\_RGB-5$$

Thus, the value of QP_Y can be approximated as the value of QP_RGB-5. Similarly, the values of QP_Co and QP_Cg are adjusted relative to the value of QP_RGB. Since the energy contribution from the Co component through the inverse color space conversions is $(1)_2+(0)^2+(-1)^2=2$, the value of QP_Co is the value of QP_RGB$-3*\log_2$(2)=QP_RGB-3. Like the value of QP_Y, the value of QP_Cg can be approximated as the value of QP_RGB$-3*\log_2(3)$=QP_RGB$-4.755 \approx$QP_RGB$-5$. Thus, to compensate for the energy ratio of 3:2:3 when converting the Y, Co and Cg components back to the RGB domain, the QP values used for the Y, Co and Cg components are approximately $-5$, $-3$ and $-5$ relative to the QP value used for R, G and B components. For example, if QP_RGB is 16, then QP_Y=QP_Cg=11, and QP_Co=13. Or, if QP_RGB is 28, then QP_Y=QP_Cg=23, and QP_Co=25.

An adjustment of $-5$ to QP value corresponds to scaling by a factor of $2^{5/6}=1.78$. An adjustment of $-3$ to QP value corresponds to scaling by a factor of $2^{3/6}=1.41$.

If the QP values of R, G, and B components of an RGB-coded block of a picture or slice are different, the adjustments to QP values or scaling factors for Y, Co, and Cg components can be computed as follows. The QP values of the R, G, and B components are assigned to Y, Co, and Cg components, then adjusted by the QP adjustment factors that are based on energy amplification for the Y, Co and Cg color components in the inverse color space conversion operations. For example, suppose QP_R is 19, QP_G is 28, and QP_B is 33. In this case, the encoder and decoder can assign the QP values to first, second and third color components in the same order, then apply the QP value adjustments: QP_Y=19$-5$=14, QP_Co=28$-3$=25, and QP_Cg=33$-5$=28. Or, the encoder and decoder can assign the QP values to first, second and third color components in a different order, then apply the QP value adjustments. E.g., QP_Y=28$-5$=23, QP_Co=33$-3$=30, and QP_Cg=19$-5$=14. Or, the QP value adjustments can depend on only the QP value used for the first color component in the first color space. Or, the QP value adjustments can depend on only the minimum QP value used for the color components of the first color space. Regardless, the energy of the quantization error for RGB-coded blocks (without color space conversion) is roughly equivalent to the energy of quantization for YCoCg-coded blocks when converted back to RGB color space.

As noted above, quantization error can generally be modeled as a function of QP value (measuring quantization error as a linear function of $QSS^2$). In particular, this relationship holds for smaller QP values (and QSS). The relationship may not be as accurate for higher QP values, however. Therefore, in some example implementations, an encoder or decoder can use different QP value adjustments for color components of the second color space depending on the QP value(s) of the color components of the first color space. For example, the encoder/decoder can use a lookup table or other structure to determine QP value adjustments for the color components of the second color space depending on the QP values used for the first color space, where the lookup table or other structure associates different QP value adjustments (for the color components of the second color space) with different QP values used for the first color space. The lookup table or other structure can include values for a particular pair of color spaces (first color space, second color space). For example, a lookup table QPAdjustOffset can be organized by color component (component_ID) of the second color space and QP value (QP_CS1) in the first color space.

*QPAdjustOffset*[component_ID][QP_CS1]

For a given color component component_ID of the second color space, the lookup table includes QP value adjustments for different QP values QP_CS1 used in the first color space. For a given QP value QP_CS1 used in the first color space and given color component component_ID of the second color space, the encoder/decoder can determine a QP value adjustment to use for that color component component_ID of the second color space.

The encoder and decoder can further adjust the QP values for the color components of the second color space, starting from the QP values of the first, second and third color components for the first color space with QP value adjustments applied. For example, the encoder increases a QP value for one of the color components of the second color space (which increases amplified energy of quantization error), then decreases the QP value for another color component of the second color space to compensate for the increase. Or, the encoder decreases a QP value for one of the color components of the second color space (which decreases amplified energy of quantization error), then increases the QP value for another color component of the second color space to compensate for the decrease. For example, starting from QP_Y=23, QP_Co=30, and QP_Cg=14, the encoder can decrease QP_Y to 18 and increase QP_Cg to 22 without significantly changing the overall energy of quantization error. (The decrease in energy of quantization error of roughly 166 (from changing QP_Y from 23 to 18) is offset by the increase in energy of quantization error of roughly 162 (from changing QP_Cg from 14 to 22).)

An encoder and decoder can similarly determine per color component color space adjustments when converting between other color spaces during encoding or decoding, depending on energy amplification for the respective color components of the second color space in the inverse color space conversion operations. In general, the color space conversion matrix $CC\_matrix_{1\_to\_2}$ for transformation from a first color space to a second color space can be defined as:

$$\begin{bmatrix} c_{00} & c_{01} & c_{02} \\ c_{10} & c_{11} & c_{12} \\ c_{20} & c_{21} & c_{22} \end{bmatrix}$$

To adjust the dynamic range of output, a matrix of offsets $CC\_offsets_{1\_to\_2}$ can be used. The offsets $CC\_offsets_{1\_to\_2}$ can be defined as:

$$\begin{bmatrix} o_0 \\ o_1 \\ o_2 \end{bmatrix}$$

Suppose the sample values for a position in the first color space are $Ps_{CC1}=[Ps_{00}, Ps_{01}, Ps_{02}]^T$. The sample values $Ps_{CC2}$ for the position in the second color space can be calculated as:

$Ps_{CC2}=CC\_matrix_{1\_to\_2}*Ps_{CC1}+CC\_offsets_{1\_to\_2}$

The sample values $Ps_{CC2}$ are clipped to the appropriate range.

The color space conversion matrix $CC\_matrix_{2\_to\_1}$ for transformation from a second color space back to a first color space can be defined as:

$$\begin{bmatrix} c'_{00} & c'_{01} & c'_{02} \\ c'_{10} & c'_{11} & c'_{12} \\ c'_{20} & c'_{21} & c'_{22} \end{bmatrix}$$

To adjust the dynamic range of output, a matrix of offsets $CC\_offsets_{2\_to\_1}$ can be used. The offsets $CC\_offsets_{2\_to\_1}$ can be defined as:

$$\begin{bmatrix} o'_0 \\ o'_1 \\ o'_2 \end{bmatrix}$$

Suppose the sample values for a position in the second color space are $Rs_{CC2}=[Rs_{00}, RS_{01}, Rs_{02}]^T$. The sample values $Rs_{CC1}$ for the position in the first color space can be calculated as:

$Rs_{CC1}=CC\_matrix_{2\_to\_1}*(Rs_{CC2}+CC\_offsets_{2\_to\_1})$

The sample values $Rs_{CC1}$ are clipped to the appropriate range.

Per component color space adjustment factors can be determined based on the energy amplification (energy ratio) for the respective color components of the second color space in the inverse color space conversion operations. For example, the total energy contribution for a first component in the inverse color space conversions is $cs2to1\_0_{contribution}=(c'_{00})^2+(c'_{10})^2+(c'_{20})^2$. The total energy contribution for a second component is $cs2to1\_1_{contribution}=(c'_{01})^2+(c'_{11})^2+(c'_{21})^2$, and the total energy contribution for a third component through the inverse color space conversions is $cs2to1\_2_{contribution}=(c'_{02})_2+(c'_{12})^2+(c'_{22})^2$. From these energy contributions, the encoder and decoder can determine adjustments to QP values or scaling factors for the respective components of the second color space, relative to a QP value QP_CS1 for the first color space. The QP value QP_CS2_0 for a first component of the second color space can be determined as $QP\_CS2\_0=QP\_CS1-3*\log_2(cs2to1\_0_{contribution})$, where $-3*\log_2(cs2to1\_0_{contribution})$ indicates the QP value adjustment. The QP values QP_CS2_1 and QP_CS2_2 for the second and third color components of the second color space can similarly be determined using $cs2to1\_1_{contribution}$ and $cs2to1\_2_{contribution}$. Alternatively, scaling factors corresponding to the QP value adjustments can be computed.

If the QP values of the color components of the first color space have different values (e.g., QP_CS1_R, QP_CS1_G, QP_CS1_B), the QP values of the color components of the second color space can be assigned as described above, starting from the QP values of the color components of the first color space, and applying the QP value adjustments. After they are assigned and adjusted, the QP values for the color components of the second color space can be increased or decreased as described above, while keeping the level of energy of quantization error roughly the same.

In some example implementations (see section VII.D), an encoder assigns QP values to color components of a second color space using syntax elements signaled in a bitstream, and a decoder assigns QP values to the color components of the second color space according to the signaled syntax elements. In these implementations, the encoder has the flexibility to assign a lower QP value to a color component of the second color space that has the highest energy or information content, and assign higher QP values to other color components, or otherwise assign the QP values as the encoder deems to be appropriate. In other example implementations (see section VII.E), an encoder and decoder assign modified QP values to color components according to rules. For example, the encoder and decoder assign modified QP values to the color components of the second color space in the order of the QP values for the color components of the first color space. Or, the encoder and decoder assign a lowest QP value, if any, to a first color component of the second color space (e.g., the color component that is expected to have highest energy or information content) and assign the other QP values to the other color components of the second color space.

D. Examples of Syntax Elements to Indicate QP Values for Per Component Color Space Adjustment Factors.

To compensate for amplification of the energy of quantization error in inverse color space conversion operations, an encoder and decoder can use different QP values for color components in a second color space. The encoder can determine and assign QP values for the color components of the second color space using any of the approaches described in section VII.C. Once the QP values are assigned, the encoder can signal them using syntax elements in the bitstream. This section describes various ways to signal syntax elements that indicate the QP values for the color components in the second color space.

In general, the QP values for color components in the second color space can be signaled differentially (as offsets) relative to QP values of corresponding color components in the first color space. Or, the QP values for second and third color components in the second color space can be signaled differentially (as offsets) relative to the QP value for a first color component in the second color space, which itself can be signaled differentially relative to a QP value for the first color space. Or, the QP values for the color components in the second color space can be signaled in some other way.

For example, the QP values for a first color space and second color space can be signaled at slice level (e.g., in a slice header). In some H.265/HEVC implementations (see JCTVC-P1003), the syntax element slice_qp_delta is signaled in a slice header and indicates an offset for QP value of the slice relative to an initial QP value for a picture that includes the slice.

Instead of using a single syntax element for a slice QP offset, two different syntax elements can indicate a slice QP offset for the first color space and a slice QP offset for the second color space, respectively. For example, slice_qp_delta can indicate the QP offset for a slice when the first color space is used within the slice, and slice_qp_delta_cs2 can indicate the QP offset for the slice when the second color space is used within the slice. The syntax element slice_qp_delta_cs2 can be conditionally signaled when at least two color spaces are used. The syntax element slice_qp_delta_cs2 can indicate a difference relative to the QP value for the slice for the first color space. That is, the QP value for the slice for the first color space is 26+init_qp_minus_26+slice_qp_delta, and the QP value for the slice for the second color space is 26+init_qp_minus_26+slice_qp_delta+slice_qp_delta_cs2. Alternatively, the syntax element slice_qp_delta_cs2 can indicate a difference relative to the initial QP value for the picture. That is, the QP value for the slice when the second color space is used is 26+init_qp_minus_26+slice_qp_delta_cs2.

Or, instead of signaling two QP values in a slice header, the QP values for the second color space can be signaled at picture level (e.g., in a PPS). In some H.265/HEVC implementations, the syntax element init_qp_minus 26 is signaled in a PPS and indicates an initial QP value for a picture. Another syntax element init_qp_diff_cs2 in the PPS can indicate an initial QP value for the picture for a second color space (or a first color component of the second color space), relative to the initial QP value for the picture for the first color space (indicated with init_qp_minus_26). That is, the QP value for the picture for the second color space is 26+init_qp_minus_26+init_qp_diff_cs2. Alternatively, a syntax element init_qp_minus_26_cs2 in the PPS can directly indicate the initial QP value for the picture for the second color space (or a first color component of the second color space). In either case, the QP values for a slice for the first color space and the second color space can be derived using a slice QP offset. For example, the QP value for a slice for the first color space is the initial QP value for the picture for the first color space+slice_qp_delta, and the QP value for the slice for the second color space is the initial QP value for the picture for the second color space+slice_qp_delta.

Instead of signaling a single QP value for each color space (for a slice or picture), different QP values can be signaled for different color components in the second color space. For example, at picture level (e.g., in a PPS), offsets for the second and third color components of a picture for a second color space can be signaled as offsets relative to QP values of corresponding color components in the first color space for the picture. In some H.265/HEVC implementations, the syntax elements pps_cb_qp_offset and pps_cr_qp_offset indicate offsets for second and third color components of the first color space (whether YCbCr or another color space) relative an initial QP value for a picture (for the first color component of the first color space). Two additional syntax elements pps_cb_qp_offset_cs2 and pps_cr_qp_offset_cs2 can indicate offsets for the second and third color components of the second color space (whether YCbCr or another color space) relative to the QP values for the second and third color components of the first color space, respectively. Or, the offsets for the second and third color components of the second color space can be signaled as offsets relative to an initial QP value for the picture for the second color space. For example, the syntax elements pps_cb_qp_offset_cs2 and pps_cr_qp_offset_cs2 can indicate offsets for the second and third color components of the second color space relative to the QP value for the picture (and first color component) for the second color space.

Or, at slice level (e.g., in a slice header), the offsets for the second and third color components of a slice for a second color space can be signaled as offsets relative to QP values of corresponding color components in the first color space for the slice. In some H.265/HEVC implementations, the syntax elements slice_cb_qp_offset and slice_cr_qp_offset indicate offsets for second and third color components of the first color space (whether YCbCr or another color space) relative a QP value for the slice (for the first color component of the first color space). Two additional syntax elements slice_cb_qp_offset_cs2 and slice_cr_qp_offset_cs2 can indicate offsets for the second and third color components of the second color space (whether YCbCr or another color space) relative to the QP values for the second and third color components of the first color space, respectively. Or, the offsets for the second and third color components of the slice for the second color space can be signaled as offsets relative to a QP value for a first color component of the slice for the second color space. For example, the syntax elements slice_cb_qp_offset_cs2 and slice_cr_qp_offset_cs2 can indicate offsets for the second and third color components of the second color space relative to the QP value for the first color component of the slice for the second color space.

In this way, QP values are signaled for a picture or slice for the first color space and for the second color space. When the encoder or decoder switches color spaces between units (e.g., between blocks or slices of a picture, or between blocks of a slice), the encoder or decoder has the appropriate QP values to apply. Alternatively, syntax elements that indicate QP values for color components of a second color space are signaled in some other way.

E. Examples of Derivation Rules for QP Values for Per Component Color Space Adjustment Factors.

Instead of signaling different QP values for color components in the second color space, an encoder and decoder can derive the QP values according to rules, depending on the identity of the second color space, starting from the QP values of the color components in the first color space. In this way, the encoder and decoder can modify the QP values used during encoding and decoding to compensate for amplification of the energy of quantization error in inverse color space conversion operations. Section VII.C describes ways to determine QP value adjustments depending on the inverse color space conversion operations used when converting from the second color space back to the first color space. One of these approaches can be applied automatically by an encoder and decoder, without signaling syntax elements that indicate QP value adjustments for color components of the second color space.

The encoder and decoder can modify final QP values for the color components of the first color space, after the QP values for the color components of the first color space are otherwise determined. For example, for a block encoded in YCoCg color space, the encoder and decoder can adjust a final QP value QP_RGB used for RGB-coded blocks by −5, −3 and −5 for QP values for Y, Co, and Cg components, respectively. (The derivation of the adjustment factors of −5, −3, and −5 is explained above.) In some H.265/HEVC implementations, the variables Qp'Y, Qp'Cb, and Qp'Cr indicate final QP values for first, second and third color components for YCbCr, RGB or another first color space (the variable names can change). If the YCoCg color space is used for encoding, to determine the QP values for the Y, Co and Cg color components, the final QP values Qp'Y, Qp'Cb, and Qp'Cr are adjusted as follows: Qp'Y−=5, Qp'Cb−=3, and Qp'Cr−=5. The per color component color space adjustments of −5, −3, and −5 are part of the derivation rules. The adjusted QP values can be clipped at the minimum allowed QP value.

For another second color space, the adjustments to final QP values Qp'Y, Qp'Cb, and Qp'Cr can similarly be modified depending on the energy amplification for the respective color components of that second color space in inverse color space conversion operations.

Or, instead of modifying final QP values of the color components for the first color space, the encoder and decoder can modify intermediate QP values for at least some of the color components for the first color space. For example, for a block encoded in YCoCg color space, the encoder and decoder can adjust intermediate QP values for Co and Cg components, respectively. In some H.265/HEVC implementations, the variables qPiCb and qPiCr indicate intermediate QP values for second and third color components for YCbCr, RGB or another first color space (the variable names can change), and the variable QpY indicates an intermediate QP value for a first color component for the first color space. If the YCoCg color space is used for encoding, to determine the QP values for the Y, Co and Cg color components, the final QP value Qp'Y and intermediate QP values qPiCb and qPiCr are determined as follows:

$$Qp'Y = QpY + QpBdOffsetY - 5$$

$$qPiCb = \text{Clip3}(-QpBdOffsetC, 57, QpY - 3 + pps\_cb\_qp\_\text{offset} + slice\_cb\_qp\_\text{offset})$$

$$qPiCr = \text{Clip3}(-QpBdOffsetC, 57, QpY - 5 + pps\_cr\_qp\_\text{offset} + slice\_cr\_qp\_\text{offset})$$

These equations use syntax elements that indicate QP values for color components of the first color space (e.g., pps_cb_qp_offset, slice_cb_qp_offset, pps_cr_qp_offset, and slice_cr_qp_offset), but not syntax elements that indicate per color component color space adjustments. Instead, the per color component color space adjustments of −5, −3, and −5 are part of the derivation rules. The adjusted QP values can be clipped at the minimum allowed QP value.

For another second color space, the adjustments to intermediate QP values can similarly be modified depending on the energy amplification for the respective color components of that second color space in the inverse color space conversion operations.

By rule, the encoder and decoder can assign modified QP values to the color components of the second color space in the order of the QP values for the color components of the first color space. Or, by rule, the encoder and decoder can assign a lowest modified QP value, if any, to a first color component of the second color space (e.g., the color component which is expected to have highest energy or information content) and assign the other modified QP values to the other color components of the second color space.

F. Examples of Scaling Factors for Per Component Color Space Adjustment Factors.

Instead of modifying QP values to compensate for amplification of the energy of quantization error in inverse color space conversion operations, the encoder and decoder can modify the process of scaling transform coefficients.

For example, a list of scaling factors that will be applied to transform coefficients can be modified. After determining frequency-specific scaling factors m[x][y], if a second color space is used, m[x][y] can be modified depending on the color component whose transform coefficients are being scaled. The variable cIdx indicates the index of the color component. When the first color space is RGB and the second color space is YCoCg, for example, m[x][y] can be modified by component-specific scaling factors of 1.78, 1.41 and 1.78 for Y, Co and Cg components, respectively. The component-specific scaling factors of 1.78, 1.41 and 1.78 correspond to QSS changes of $2^{5/6}$, $2^{3/6}$ and $2^{5/6}$, respectively, and roughly correspond to QP value adjustments of −5, −3 and −5, respectively. If cIdx is 0 or 2, m[x][y]*=1.78. Otherwise, if cIdx is 1, m[x][y]*=1.41. Alternatively, instead of using floating point operations, m[x][y] can be modified using integer operations.

For another second color space, the component-specific scaling factors are modified depending on the energy amplification for the respective color components of that second color space in the inverse color space conversion operations.

Or, without modifying m[x][y], the encoder and decoder can separately account for the component-specific scaling factors for different color components of the second color space when performing scaling operations. For example, an array factor[cIdx] stores the component-specific scaling factors for the color components of the second color space. When the second color space is YCoCg, for example, factor[cIdx] is {1.78, 1.41, 1.78}. For another second color space, the component-specific scaling factors are modified depending on the energy amplification for the respective color components of that second color space in the inverse color space conversion operations. The transform coefficients in the array TransCoeffLevel are inverse quantized and scaled as follows.

$$d[x][y] = \text{Clip3}(-32768, 32767, ((\textit{TransCoeffLevel} \\ [xTbY][yTbY][cIdx][x][y] * m[x][y] * \text{factor}[cIdx] \\ * \text{levelScale}[qP\%6] << (qP/6)) + (1 << (bdShift-1))) \\ >> bdShift)$$

Or, the encoder and decoder can perform the scaling operations using integer-only operations, where factor1[cIdx] and factor2[cIcbc] include integer values defined such that factor1[cIdx]/factor2[cIdx] approximates factor[cIdx].

$$d[x][y]=\text{Clip3}(-32768,32767,((TransCoeffLevel\\
[xTbY][yTbY][cIdx][x][y]*m[x][y]*\text{factor1}[cIdx]/\\
\text{factor2}[cIdx]*levelScale[qP\%6]<<(qP/6))+(1<<\\
(bdShift-1)))>>bdShift)$$

The component-specific scaling factors for color components of the second color space can be signaled in the bitstream or derived using reconstruction rules at the encoder and decoder.

Alternatively, an encoder and decoder can use different frequency-specific scaling factors m[x][y] and m_cs2[x][y] for different color spaces or for different color components of the different color spaces. The frequency-specific scaling factors for the different color spaces/color components can be signaled in the bitstream or derived using reconstruction rules at the encoder and decoder.

G. Examples of Additional Encoder-Side Changes.

Aside from changes to quantization or scaling, encoder-side decision-making processes can be modified to reflect adjustments to QP values or scaling. An encoder can modify the Lagrangian multiplier X used in rate-distortion-optimized quantization ("RDOQ") to match the QP values used for different color components of different color spaces. For example, if the QP value increases by 1, the related Lagrangian multiplier is increased by $2^{1/3}$: $\lambda=\lambda *2^{1/3}$ for RDOQ. If the QP value changes by some other amount, the Lagrangian multiplier is increased or decreased accordingly. Thus, if the QP values for Y, Co, and Cg components are determined by adjusting the QP value of R, G, and B components by −5, −3 and −5, the corresponding Lagrangian multipliers for RDOQ are set to $\lambda\_Y=\lambda\_RGB*2^{-5/3}$, $\lambda\_Co=\lambda\_RGB*2^{-3/3}$ and $\lambda\_Cg=\lambda\_RGB*2^{-5/3}$, respectively, where $\lambda\_RGB$ is the Lagrangian multiplier for RDOQ in the RGB color space.

Alternatively, the encoder can modify the Lagrangian multipliers for RDOQ in the second color space without changing QP values.

For another second color space, the Lagrangian multipliers for RDOQ can similarly be modified depending on the adjustments made to QP values or scaling.

Aside from RDOQ, a Lagrangian multiplier $\lambda$ for another rate-distortion decision-making process can be modified depending on adjustments made to QP values or scaling. For example, the $\lambda$ value used in rate-distortion analysis when deciding between coding modes or options (e.g., intra prediction directions) for encoding in the second color space can be modified according to the difference in QP values between the first color space and the second color space. The encoder can select the best mode or option according to rate-distortion cost, which is weighted by the modified X value for the second color space.

H. Alternative Approach with Only Encoder-Side Changes.

Alternatively, an encoder can adjust QP values on a unit-by-unit basis to compensate for amplification of energy of quantization error in inverse color space conversion operations. The encoder sets QP values on a unit-by-unit basis using existing syntax elements for specifying QP values for the respective units. From the signaled syntax elements, a decoder determines the QP values on a unit-by-unit basis for the respective units, without making color space adjustments to the QP values. For example, for a first unit encoded in a first color space (e.g., RGB), the encoder uses a first set of QP values and signals syntax elements indicating the first set of QP values for the first unit. Then, for a second unit encoded in a second color space (e.g., YCoCg), the encoder uses a second set of QP values and signals syntax elements indicating the second set of QP values for the second unit. The second set of QP values can be determined as explained above to compensate for amplification of the energy of quantization error in inverse color space conversion operations. For example, the QP values for the second unit are adjusted by factors of −5, −3, and −5 for Y, Co, and Cg components, respectively. For another second color space, the adjustments made to QP values are modified accordingly.

Adjustments to QP values can be signaled on a CU-by-CU basis, when color space switching can happen on a CU-by-CU basis. In some H.265/HEVC implementations, offsets for QP values are signaled as part of TU-level syntax for different CUs. For example, the syntax elements cu_qp_delta_abs and cu_qp_delta_sign_flag can be used to indicate a first QP offset for a first CU that is coded in a first color space such as RGB, and the syntax elements cu_qp_delta_abs and cu_qp_delta_sign_flag can later be used to indicate a second QP offset for a second CU that is coded in a second color space such as YCoCg. Per color component QP values in the second color space can be determined using other QP offset values for the second and third color components.

Or, adjustments to QP values can be signaled on a slice-by-slice basis, when color space switching can happen on a slice-by-slice basis. In some H.265/HEVC implementations, QP values can be set in slice headers using slice_qp_delta, slice_cb_qp_offset and slice_cr_qp_offset syntax elements to indicate the QP values for a given slice. For example, the syntax elements slice_qp_delta, slice_cb_qp_offset and slice_cr_qp_offset can be used to indicate QP values for a first slice that is coded in a first color space such as RGB, and the syntax elements slice_qp_delta, slice_cb_qp_offset and slice_cr_qp_offset can later be used to indicate QP values for a second slice that is coded in a second color space such as YCoCg. Or, adjustments to QP values can be signaled on some other unit-by-unit basis, when color space switching can happen between such units.

I. Examples of Adjusting Quantization/Scaling or Inverse Quantization/Scaling When Switching Color Spaces During Encoding or Decoding.

Figure 12:
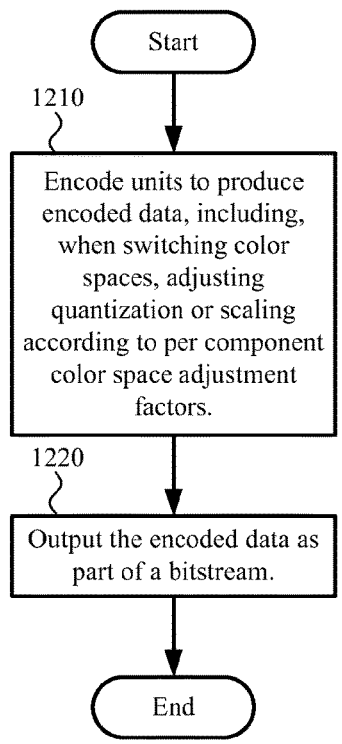
FIG. 12 is a flowchart illustrating a generalized technique for adjusting quantization or scaling when switching color spaces during encoding.
Figure 13:
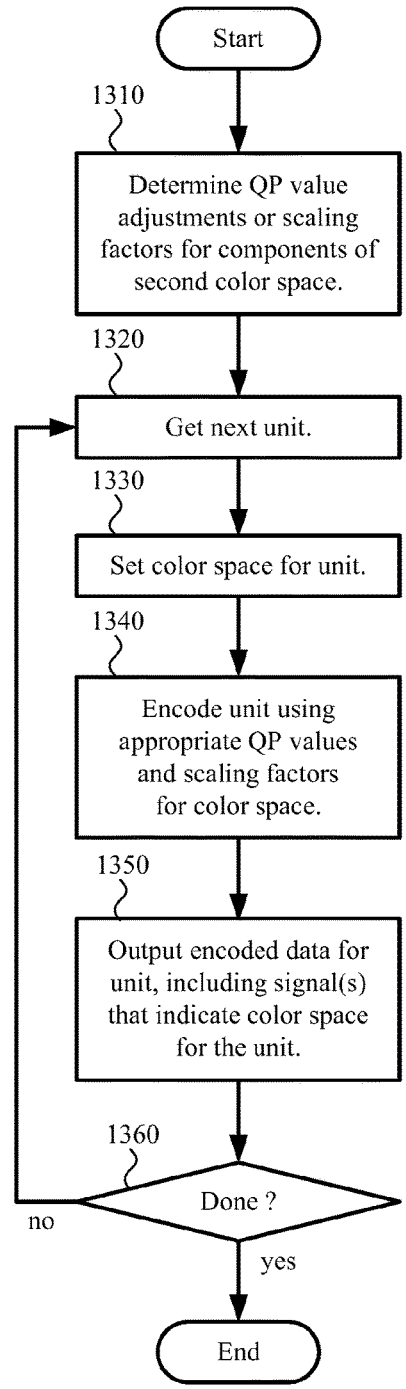
FIG. 13 is a flowchart illustrating a more detailed example technique for adjusting quantization or scaling when switching color spaces on a unit-by-unit basis during encoding.

FIG. 12 shows a generalized technique (1200) for adjusting quantization or scaling when switching color spaces during encoding, and FIG. 13 shows a more detailed example technique (1300) for adjusting quantization or scaling when switching color spaces on a unit-by-unit basis. An image encoder or video encoder such as one described with reference to FIG. 3 or FIGS. 5a-5b, or other encoder, can perform the technique (1200) or the technique (1300).

FIG. 14 shows a generalized technique (1400) for adjusting inverse quantization or scaling when switching color spaces during decoding, and FIG. 15 shows a more detailed example technique (1500) for adjusting inverse quantization or scaling when switching color spaces on a unit-by-unit basis. An image decoder or video decoder such as one described with reference to FIG. 4 or FIG. 6, or other decoder, can perform the technique (1400) or the technique (1500).

With reference to FIG. 12, the encoder encodes (1210) units of an image or video (e.g., pictures, slices, CUs, blocks) to produce encoded data. As part of the encoding, when switching from a first color space to a second color space between two of the units (e.g., from an RGB-type color space to a YUV-type color space, or from a YUV-type color space to an RGB-type color space), the encoder adjusts quantization or scaling for color components of the second color space according to per component color space adjustment factors. The encoder outputs (1220) the encoded data as part of a bitstream.

With reference to FIG. 13, an encoder determines (1310) QP value adjustments or scaling factors for components of the second color space. For example, the encoder determines the QP value adjustments or scaling factors using any of the approaches described herein. The encoder also determines QP values and scaling factors for components of the first color space. The encoder gets (1320) the next unit (e.g., picture, slice, CU) of video and sets (1330) the color space for the unit. For example, the encoder selects between an RGB-type color space and a YUV-type color space (such as YCoCg) for the unit. The encoder then encodes (1340) the unit using appropriate QP values and scaling factors for the selected color space. The encoder outputs (1350) encoded data for the unit, which includes one or more signals that indicate the color space for the unit. The encoder checks (1360) whether to continue with the next unit and, if so, gets (1320) the next unit.

With reference to FIG. 14, the decoder receives (1410) encoded data as part of a bitstream. The decoder decodes (1420) the encoded data to reconstruct units of an image or video (e.g., pictures, slices, CUs, blocks). As part of the decoding, when switching from a first color space to a second color space between two of the units (e.g., from an RGB-type color space to a YUV-type color space, or from a YUV-type color space to an RGB-type color space), the decoder adjusts inverse quantization or scaling for color components of the second color space according to per component color space adjustment factors.

With reference to FIG. 15, a decoder determines (1510) QP value adjustments or scaling factors for components of the second color space. For example, the decoder determines the QP value adjustments or scaling factors using any of the approaches described herein. The decoder also determines QP values and scaling factors for components of the first color space. The decoder gets (1520) encoded data for the next unit (e.g., picture, slice, CU) of video, which includes one or more signals that indicate the color space for the unit. The decoder determines (1530) the color space for the unit. For example, based on the signal(s), the decoder selects between an RGB-type color space and a YUV-type color space (such as YCoCg) for the unit. The decoder decodes (1540) the unit using appropriate QP values and scaling factors for the selected color space. The decoder checks (1550) whether to continue with the next unit and, if so, gets (1520) the encoded data for the next unit.

In general, the per component color space adjustment factors compensate for amplification of energy of quantization error when converting from the second color space back to the first color space. Otherwise, if QP values and scaling factors from the first color space are simply applied to sample values in the second color space, quantization error in the second color space is amplified by the inverse color space conversion operations back to the first color space.

For the examples shown in FIGS. 12-15, one or more syntax elements in the bitstream can indicate the per component color space adjustment factors. The syntax element(s) can be signaled at picture level, slice level, a syntax level for a coding unit or block, or some other syntax level. The syntax element(s) can include a syntax element that indicates a QP value for a first color component of the second color space as well as syntax elements that indicate offsets for second and third color components of the second color space. Section VII.D describes examples of signaling of QP values for color components of a second color space.

Or, instead of being indicated by syntax elements in the bitstream, the per component color space adjustment factors for the color components of the second color space can be derived by rule depending on the second color space, starting from the QP values of the color components of the first color space. Section VII.E describes examples of derivation rules for QP values for color components of a second color space.

The act of adjusting quantization or inverse quantization can include adjusting final QP values or intermediate QP values of color components for the first color space in order to determine the QP values for the color components of the second color space. For example, if the first color space is RGB and the second color space is YCoCg, the per component color space adjustment factors can be −5, −3 and −5 for Y, Co and Cg components. More generally, the per component color space adjustment factors for quantization and inverse quantization can depend on energy amplification for the respective color components of the second color space in inverse color space conversion operations.

The adjusted scaling during encoding or decoding can include scaling transform coefficients using the per component color space adjustment factors. The scaling can use integer-only operations or floating point operations. The per component color space adjustment factors can be incorporated into frequency-specific scaling factors or be separately applied. For example, if the first color space is RGB and the second color space is YCoCg, the component-specific scaling factors can be 1.78, 1.41 and 1.78 for Y, Co and Cg components. More generally, the per component color space adjustment factors for scaling can depend on energy amplification for the respective color components of the second color space in inverse color space conversion operations. For additional details, see Section VIII.F.

Or, for changes during encoding that do not require corresponding changes during decoding, the encoder can set per component QP values on a unit-by-unit basis. In this case, the bitstream includes syntax elements that indicate the per component QP values for the respective units. For additional details, see Section VIII.H.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing device comprising:
one or more buffers configured to store an image or video; and
an image encoder or video encoder configured to perform operations comprising:
encoding units of the image or video to produce encoded data, including, when switching from a first color space to a second color space between two of the units, adjusting final quantization parameter ("QP") values or intermediate QP values for color components of the second color space according to per component color space adjustment factors, wherein the first color space is RGB and the second color space is YCoCg, and wherein the per component color space adjustment factors adjust the final QP values or intermediate QP values for the color components of the second color space by offsets of −5, −3 and −5 for Y, Co and Cg components, respectively; and outputting the encoded data as part of a bitstream.

2. The computing device of claim 1 wherein the units are coding units or blocks.

3. The computing device of claim 1 wherein the bitstream includes one or more syntax elements that indicate the per component color space adjustment factors.

4. The computing device of claim 3 wherein the one or more syntax elements are signaled at picture level or slice level, and wherein the one or more syntax elements include a syntax element that indicates (a) an initial quantization parameter value for a first color component of the second color space or (b) an offset for the first color component of the second color space relative to an initial quantization parameter value for the first color space.

5. The computing device of claim 4 wherein the one or more syntax elements further include syntax elements that indicate offsets for second and third color components of the second color space relative to quantization parameter values for second and third color components of the first color space.

6. The computing device of claim 1 wherein the per component color space adjustment factors are derived by rule depending on the second color space without signaling of syntax elements that indicate the per component color space adjustment factors for the color components of the second color space.

7. The computing device of claim 1 wherein the per component color space adjustment factors depend on energy amplification for the respective color components of the second color space in inverse color space conversion operations.

8. The computing device of claim 1 wherein the per component color space adjustment factors compensate for amplification of energy of quantization error when converting from the second color space back to the first color space.

9. The computing device of claim 1 wherein the adjusting includes setting per component quantization parameter values on a unit-by-unit basis.

10. In a computing device with an image decoder or video decoder, a method comprising:

receiving encoded data as part of a bitstream; and decoding the encoded data to reconstruct units of an image or video, including, when switching to a first color space from a second color space between two of the units, adjusting final quantization parameter ("QP") values or intermediate QP values for color components of the second color space according to per component color space adjustment factors, wherein the first color space is RGB and the second color space is YCoCg, and wherein the per component color space adjustment factors adjust the final QP values or intermediate QP values for the color components of the second color space by offsets of −5, −3 and −5 for Y, Co and Cg components, respectively.

11. The method of claim 10 wherein the units are coding units or blocks.

12. The method of claim 10 wherein the bitstream includes one or more syntax elements that indicate the per component color space adjustment factors.

13. The method of claim 12 wherein the one or more syntax elements are signaled at picture level or slice level, and wherein the one or more syntax elements include a syntax element that indicates (a) an initial quantization parameter value for a first color component of the second color space or (b) an offset for the first color component of the second color space relative to an initial quantization parameter value for the first color space.

14. The method of claim 13 wherein the one or more syntax elements further include syntax elements that indicate offsets for second and third color components of the second color space relative to quantization parameter values for second and third color components of the first color space.

15. The method of claim 10 wherein the per component color space adjustment factors are derived by rule depending on the second color space without signaling of syntax elements that indicate the per component color space adjustment factors for the color components of the second color space.

16. One or more computer-readable media storing computer-executable instructions for causing a computing device, when programmed thereby, to perform operations comprising:

receiving encoded data as part of a bitstream; and decoding the encoded data to reconstruct units of an image or video, including, when switching to a first color space from a second color space between two of the units, adjusting final quantization parameter ("QP") values or intermediate QP values for color components of the second color space according to per component color space adjustment factors, wherein the first color space is RGB and the second color space is YCoCg, and wherein the per component color space adjustment factors adjust the final QP values or intermediate QP values for the color components of the second color space by offsets of −5, −3 and −5 for Y, Co and Cg components, respectively.

17. The one or more computer-readable media of claim 16 wherein the bitstream includes one or more syntax elements that indicate the per component color space adjustment factors.

18. The one or more computer-readable media of claim 17 wherein the one or more syntax elements are signaled at picture level or slice level, and wherein the one or more syntax elements include a syntax element that indicates (a) an initial quantization parameter value for a first color component of the second color space or (b) an offset for the first color component of the second color space relative to an initial quantization parameter value for the first color space.

19. The one or more computer-readable media of claim 18 wherein the one or more syntax elements further include syntax elements that indicate offsets for second and third color components of the second color space relative to quantization parameter values for second and third color components of the first color space.

20. The one or more computer-readable media of claim 16 wherein the per component color space adjustment factors are derived by rule depending on the second color space without signaling of syntax elements that indicate the per component color space adjustment factors for the color components of the second color space.

* * * * *